United States Patent
Ikuta et al.

(10) Patent No.: US 10,638,010 B2
(45) Date of Patent: Apr. 28, 2020

(54) CONTROL DEVICE, IMAGE FORMING APPARATUS, AND PROGRAM

(71) Applicant: Konica Minolta, Inc., Chiyoda-ku, Tokyo (JP)

(72) Inventors: Katsuyuki Ikuta, Shizuoka (JP); Takeshi Tamada, Toyohashi (JP); Yoshihito Sasamoto, Hachioji (JP); Masahiro Kamiya, Toyohashi (JP); Shota Igo, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/914,085

(22) Filed: Mar. 7, 2018

(65) Prior Publication Data

US 2018/0270381 A1 Sep. 20, 2018

(30) Foreign Application Priority Data

Mar. 15, 2017 (JP) .................................. 2017-049997

(51) Int. Cl.
*G03G 15/08* (2006.01)
*G03G 15/00* (2006.01)
*G03G 21/20* (2006.01)
*G06F 3/12* (2006.01)
*H04N 1/00* (2006.01)
(Continued)

(52) U.S. Cl.
CPC ..... *H04N 1/00896* (2013.01); *G03G 15/0879* (2013.01); *G03G 15/5004* (2013.01); *G03G 15/556* (2013.01); *G03G 21/20* (2013.01);
*G06F 3/126* (2013.01); *G06F 3/1208* (2013.01); *G06F 3/1219* (2013.01); *G06F 3/1229* (2013.01);
(Continued)

(58) Field of Classification Search
None
See application file for complete search history.

(56) References Cited

U.S. PATENT DOCUMENTS 6,299,277 B1 * 10/2001 Fujii ...................... B41J 2/1652
347/23
6,405,000 B1 * 6/2002 Nakaya .............. G03G 15/2003
219/216
(Continued)

FOREIGN PATENT DOCUMENTS

JP  H-10275033  10/1998
JP  2002196619  7/2002
(Continued)

*Primary Examiner* — Beniyam Menberu
(74) *Attorney, Agent, or Firm* — Baker Hostetler

(57) ABSTRACT

A control device that controls an image former, includes: a second power supply that performs power feeding to a detector during a power feeding suspension period during which power feeding from a first power supply to the image former and the detector is not performed, the detector detecting an environment variable around the image former, the environment variable affecting quality of an image formed by the image former; and a determiner that determines a control condition for the image former in accordance with a result of detection performed by the detector during the power feeding suspension period, when power feeding from the first power supply to the image former is started at an end of the power feeding suspension period and the image former enters an image formation ready state in which the image former can perform image formation.

22 Claims, 19 Drawing Sheets

(51) Int. Cl.
*G06K 15/02* (2006.01)
*G06K 15/00* (2006.01)
(52) U.S. Cl.
CPC .......... G06K 15/406 (2013.01); *G06F 3/1221* (2013.01); *G06F 3/1254* (2013.01)

(56) References Cited

U.S. PATENT DOCUMENTS

| | | | | |
|---|---|---|---|---|
| 6,820,955 B1* | 11/2004 | Usui | ................... | B41J 2/04553 347/14 |
| 2001/0015818 A1* | 8/2001 | Kawanabe | ............... | B41J 2/165 358/1.15 |
| 2004/0150704 A1* | 8/2004 | Horigome | ................. | B41J 3/36 347/109 |
| 2004/0151513 A1* | 8/2004 | Nomura | ............. | G03G 15/5004 399/8 |
| 2005/0065894 A1* | 3/2005 | Inaba | ..................... | G06K 15/00 705/400 |
| 2006/0082605 A1* | 4/2006 | Arakawa | .............. | B41J 2/04586 347/5 |
| 2007/0253721 A1* | 11/2007 | Nakaue | ................ | G03G 21/203 399/27 |
| 2009/0067866 A1* | 3/2009 | Nakamura | ......... | G03G 15/2064 399/67 |
| 2009/0296163 A1* | 12/2009 | Koura | ................ | H04N 1/00885 358/403 |
| 2010/0239277 A1* | 9/2010 | Mohri | ........... | G03G 15/5008 399/43 |
| 2012/0236350 A1* | 9/2012 | Otsuka | .................. | G06F 3/1221 358/1.13 |
| 2013/0251387 A1* | 9/2013 | Tanaka | ................ | G03G 21/203 399/44 |
| 2013/0279960 A1* | 10/2013 | Kobayashi | ........... | B41J 13/0009 399/381 |
| 2013/0328401 A1* | 12/2013 | Chen | ...................... | H02J 9/061 307/64 |
| 2015/0049368 A1* | 2/2015 | Ninomiya | ........... | G03G 15/2039 358/406 |
| 2015/0198918 A1* | 7/2015 | Sakaguchi | ......... | G03G 15/2039 399/69 |
| 2015/0212483 A1* | 7/2015 | Asano | .................... | G03G 21/20 399/94 |
| 2015/0309446 A1* | 10/2015 | Teramoto | ............... | G03G 15/16 399/66 |

FOREIGN PATENT DOCUMENTS

| | | | | |
|---|---|---|---|---|
| JP | 2011248154 | * | 12/2011 | ........... G03G 15/065 |
| JP | 2015-081989 | * | 4/2015 | ............. G03G 21/20 |

* cited by examiner

| DETECTED HUMIDITY Hd (%) | ATVC | | |
|---|---|---|---|
| | ENVIRONMENT STEP | SLOPE A | OFFSET B (V) |
| 60 ≤ Hd | α | A1 | B1 |
| 30 < Hd < 60 | β | A2 | B2 |
| Hd ≤ 30 | γ | A3 | B3 |

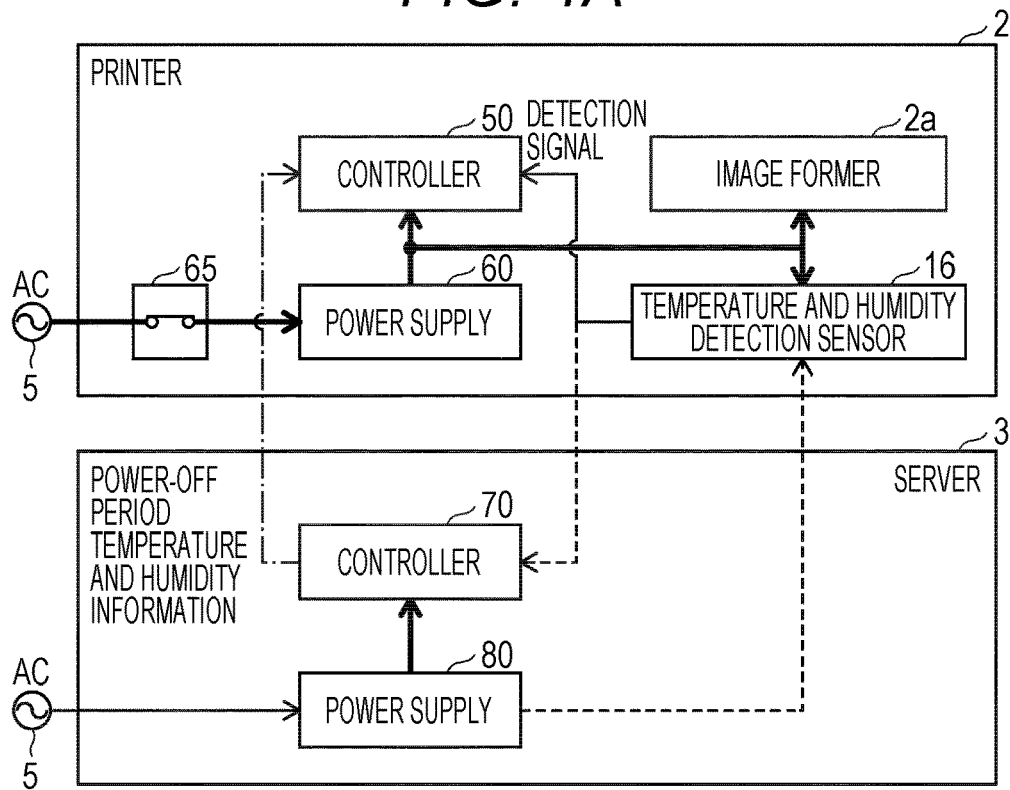
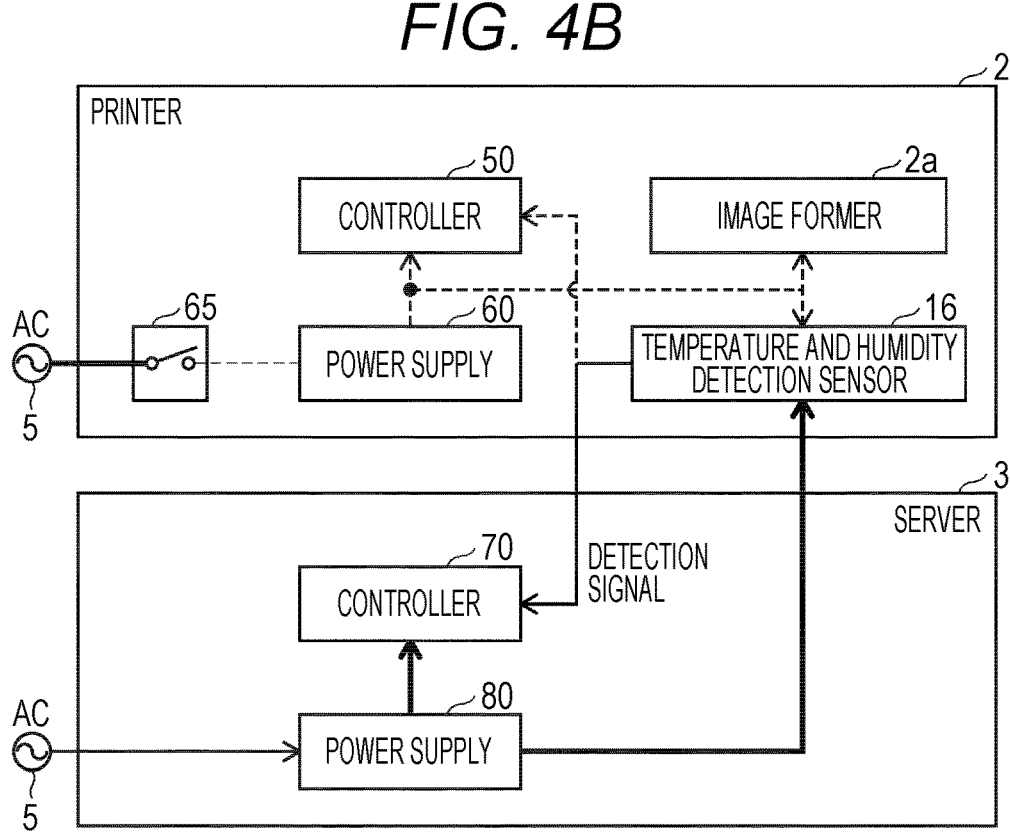

| DETECTION TIME | DETECTED VALUE |
|---|---|
| t1 | X1 |
| t2 | X2 |
| t3 | X3 |
| t4 | X4 |
| ⋮ | ⋮ |

FIG. 7

| PATTERN | 3 HOURS EARLIER | 2 HOURS EARLIER | 1 HOUR EARLIER | CURRENT HUMIDITY (%) | REFERENCE ENVIRONMENT STEP | DETERMINED ENVIRONMENT STEP |
|---|---|---|---|---|---|---|
| 1 | POWER SUPPLY ON | POWER SUPPLY ON | POWER SUPPLY ON | 30 | γ | γ |
| 2 | 50 | 50 | 30 | 30 | γ | γ |
| 3 | 50 | 50 | 50 | 30 | γ | β |
| 4 | 30 | 30 | 30 | 60 | α | β |
| 5 | 30 | 30 | 30 | 40 | β | γ |

| DETECTED TEMPERATURE Td [°C] | CONTROL CONDITION (SWEEP EXECUTION TIME) |
|---|---|
| Td < 30 | N/A |
| 30 ≤ Td < 40 | 1 MINUTE |
| 40 ≤ Td | 2 MINUTES |

FIG. 15

| PATTERN | 3 HOURS EARLIER | 2 HOURS EARLIER | 1 HOUR EARLIER | CURRENT TEMPERATURE (°C) | COVERAGE (%) | REFERENCE CONTROL CONDITION | DETERMINED CONTROL CONDITION |
|---|---|---|---|---|---|---|---|
| 1 | POWER SUPPLY ON | POWER SUPPLY ON | POWER SUPPLY ON | 30 | 20 | 1 MINUTE | 1 MINUTE |
| 2 | 40 | 40 | 30 | 30 | 30 | 1 MINUTE | 1 MINUTE |
| 3 | 40 | 40 | 40 | 30 | 40 | 1 MINUTE | 2 MINUTES |
| 4 | 40 | 40 | 40 | 30 | 5 | 1 MINUTE | N/A |

FIG. 18

| PATTERN | SERVER LOAD FACTOR (%) | | | | CURRENT TEMPERATURE (°C) | REFERENCE CONTROL CONDITION | DETERMINED CONTROL CONDITION |
|---|---|---|---|---|---|---|---|
| | 3 HOURS EARLIER | 2 HOURS EARLIER | 1 HOUR EARLIER | | | | |
| 1 | 30 | 20 | 30 | | 30 | 1 MINUTE | 1 MINUTE |
| 2 | 50 | 60 | 30 | | 30 | 1 MINUTE | 1 MINUTE |
| 3 | 50 | 60 | 60 | | 30 | 1 MINUTE | 2 MINUTES |
| 4 | 90 | 100 | 90 | | 30 | 1 MINUTE | 3 MINUTES |

CONTROL DEVICE, IMAGE FORMING APPARATUS, AND PROGRAM

The entire disclosure of Japanese patent Application No. 2017-049997, filed on Mar. 15, 2017, is incorporated herein by reference in its entirety.

BACKGROUND

Technological Field

The present invention relates to a control device that controls the image former in an image forming apparatus such as a printer or a copying machine.

Description of the Related Art

In an image forming apparatus such as a printer having a conventional configuration, the surface of an electrically charged photosensitive member is exposed and scanned, so that an electrostatic latent image is formed on the photosensitive member. The electrostatic latent image on the photosensitive member is developed with toner, and the toner image is then transferred onto a recording sheet such as paper sheet. The recording sheet after transfer is heated to fix the toner image thereto, and thus, an image is formed on the recording sheet.

In an image forming apparatus having such a configuration, the physical properties of photosensitive members, toner, paper sheets, and the like, or more specifically, the electric resistance values of these components, vary with changes in the ambient environment such as temperature and humidity. As a result, charging performance, transfer performance, and the like deteriorate, and the quality of each formed image might be degraded.

In conventional cases, an environment sensor for detecting in-machine temperature and humidity is prepared. In accordance with the results of detection performed by the environment sensor, control conditions such as a charging voltage and a transfer voltage are adjusted to values suitable for the environment at the time of the detection. In this manner, the quality of each formed image is maintained at a certain level or higher.

Patent Literature 1: JP 2002-196619 A
Patent Literature 2: JP 10-275033 A

In a case where a period of time during which an image forming apparatus is not used continues for a long period of time like the night-time from the end of work of the day to the next morning, the power switch of the image forming apparatus is normally turned off (the power supply is switched off) to save electricity.

In an image forming apparatus, the power supply is normally switched off to stop the power feeding to all the electric components in the apparatus, including the heater of the fixing unit and the environment sensor. When the power switch is turned on (the power supply is switched on) to resume the electric power supply and start the power feeding to the respective components, the image forming apparatus enters a state in which image formation jobs can be executed, as each component performs a predetermined preparatory operation, such as an operation to heat the fixing member to the fixing temperature by switching on a heater, for example. This is referred to as a "start-up".

In a case where an image formation job is executed immediately after the start-up, the problem described below easily occurs if the transfer voltage or the like is controlled in accordance with the results of detection performed by the environment sensor at the time.

Specifically, in a case where the room in which the apparatus is installed becomes highly humid during a long power-off period such as a night-time, the humid air slowly enters the apparatus, and the respective components such as the photosensitive members and the transfer roller of the transfer unit, and the paper sheets are moistened. If the room air conditioning is turned on the first thing in the next morning, the space inside the room returns to normal humidity, but, in many cases, moisture is not quickly removed from the components such as the transfer roller, and the paper sheets.

In a case where the environment sensor detects normal humidity while the electric resistance values of the transfer roller, the paper sheets, and the like are substantially in the same state as a high-humidity state, it is very difficult to set a transfer voltage that reflects the actual electric resistance values of the transfer roller, the paper sheets, and the like.

Such a problem is caused not only in the case of a start-up at a time when the power supply is switched on. For example, the problem may also be caused at a start-up when operation returns from a sleep mode for power saving. The sleep mode is a mode in which only power feeding to a receiver that receives job execution instructions is performed, unless a job execution instruction is issued within a certain period of time (10 minutes, for example). In the sleep mode, the inside of the apparatus is substantially in the same state as the state during a power-off period, and therefore, the same problem as above might occur depending on a change in the humidity in the room.

In the above described example case, a change in the humidity in the room is a change in the environment. However, a change in the environment is not necessarily a change in the humidity. For example, the above problem may also occur in an apparatus that have such characteristics that charging performance and developing performance deteriorate, resulting in degradation of the quality of a reproduced image in a case where the temperature is low at night and returns to normal temperature in the morning, but the photosensitive members and the developer contained in the developing part do not return to normal temperature.

SUMMARY

The present invention has been made in view of the above problem, and an object thereof is to provide a control device, an image forming apparatus, and a program that are capable of improving the quality of an image formed in an image formation job executed after a start-up caused by switching on of the power supply or the like.

To achieve the abovementioned object, according to an aspect of the present invention, a control device that controls an image former, reflecting one aspect of the present invention comprises: a second power supply that performs power feeding to a detector during a power feeding suspension period during which power feeding from a first power supply to the image former and the detector is not performed, the detector detecting an environment variable around the image former, the environment variable affecting quality of an image formed by the image former, and a determiner that determines a control condition for the image former in accordance with a result of detection performed by the detector during the power feeding suspension period, when power feeding from the first power supply to the image former is started at an end of the power feeding suspension period and the image former enters an image formation ready state in which the image former can perform image formation.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram showing the contents of an environment table;

FIG. 4A is a schematic diagram showing the power feeding from two power supplies to respective components when the power supply to the printer is on;

FIG. 4B is a schematic diagram showing the power feeding from the two power supplies to the respective components when the power supply to the printer is off;

FIG. 5 is a diagram showing an example of a table in which temperature and humidity information is stored;

FIG. 7 is a diagram for explaining five patterns of methods of determining the environment step in accordance with the change in the in-machine humidity over the period from a past time to the current time;

FIG. 14 is a diagram showing the contents of a control condition table;

FIG. 15 is a diagram for explaining four patterns of methods of determining the execution time of toner sweep control in accordance with changes in the in-machine temperature over the period from a past time to the current time in a third embodiment;

FIG. 18 is a diagram for explaining four patients of methods of determining the execution time of toner sweep control in accordance with changes in the load factor of the server over the period from a past time to the current time.

DETAILED DESCRIPTION OF EMBODIMENTS

Hereinafter, one or more embodiments of a control device and an image forming apparatus according to the present invention will be described with reference to the drawings. However, the scope of the invention is not limited to the disclosed embodiments.

First Embodiment (1) Structure of an Image Forming Apparatus

Figure 1:
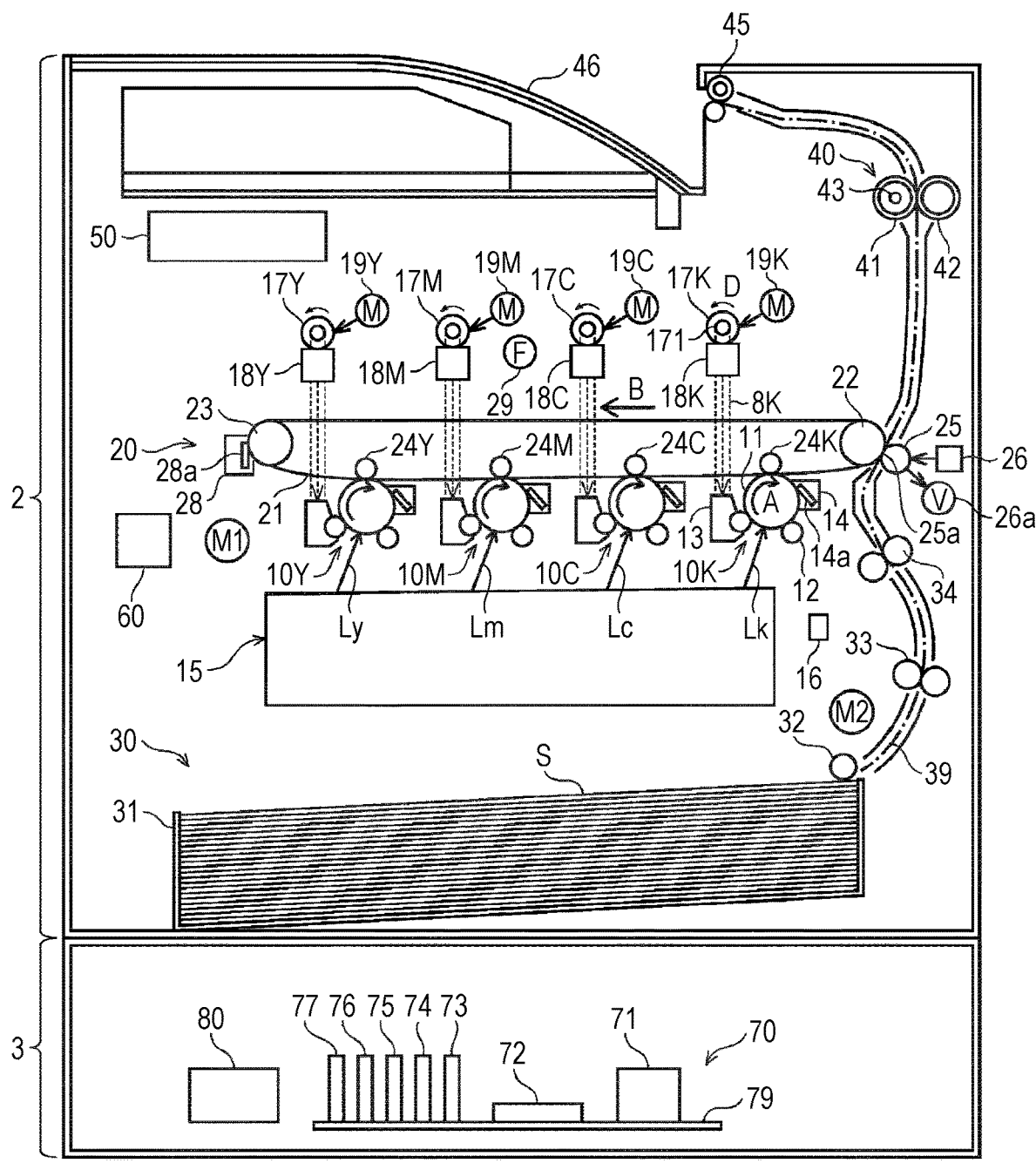
FIG. 1 is a schematic front view of the structure of an image forming apparatus according to a first embodiment.

FIG. 1 is a schematic front view of the structure of an image forming apparatus.

As shown in the drawing, the image forming apparatus 1 includes a printer 2 and a server 3.

The server 3 includes a controller 70 and a power supply 80. The server 3 is connected to one or more external terminal devices (not shown) via a network (such as a LAN), and receives print jobs sent from the respective terminal devices. The server 3 also performs processing and the like as a mail server. The server 3 may be a print server, a mail server, a WEB server, a DHCP server, or a DNS server, for example.

The printer 2 is a tandem color printer. The printer 2 is mounted on the server 3, and executes print jobs received by the server 3. Specifically, the printer 2 prints a color toner image on a recording sheet. As the printer 2 is the main part of the image forming operation, the printer 2 can be regarded as the main body of the image forming apparatus 1, and the image forming apparatus 1 can be considered to be formed with the printer 2 and the server 3.

The printer 2 includes imaging units 10Y, 10M, 10C, and 10K, an exposure unit 15, an intermediate transfer unit 20, a sheet feeder 30, a fixing unit 40, a controller 50, and a power supply 60.

The imaging unit 10K includes a photosensitive drum 11 that rotates in the direction of an arrow A, and a charger 12, a developing part 13, a cleaner 14, and the like that are disposed around the photosensitive drum 11. The imaging unit 10K forms a black (K) toner image.

The imaging units 10Y, 10M, and 10C each have basically the same structure as the imaging unit 10K, and any reference numerals are not provided for the components of the imaging units 10Y, 10M, and 10C in the drawing. The imaging unit 10Y forms a yellow (Y) toner image, the imaging unit 10M forms a magenta (M) toner image, the imaging unit 10 forms a cyan (C) toner image. Although the photosensitive drum 11 is used as the image carrier in the above described structure, this embodiment is not limited to this structure, and a photosensitive belt or the like may be used as the image carrier, for example.

The intermediate transfer unit 20 includes a driving roller 22, a driven roller 23, primary transfer rollers 24Y, 24M, 24C, and 24K, and a secondary transfer roller 25, in addition to an intermediate transfer belt 21 disposed above the imaging units 10Y through 10K.

The intermediate transfer belt 21 is stretched around the driving roller 22, the driven roller 23, and the primary transfer rollers 24Y through 24K, and is rotated in the direction of an arrow B. The photosensitive drum 11 and the intermediate transfer belt 21 are rotationally driven by the rotational driving force of a driving motor M1.

The primary transfer rollers 24Y through 24K are arranged to face the photosensitive drums 11 of the imaging units 10Y through 10K via the intermediate transfer belt 21. The secondary transfer roller 25 is formed by stacking an elastic layer made of rubber or the like having electric conductivity around a metallic shaft core, and is disposed to face the driving roller 22 via the intermediate transfer belt 21. A secondary transfer voltage (hereinafter referred to as the "transfer bias voltage") that is output from a transfer bias power supply 26 is applied to the metallic shaft core of the secondary transfer roller 25.

The exposure unit 15 is disposed below the imaging units 10Y through 10K, and emits light beams Ly, Lm, Lc, and Lk for forming images in the Y through K colors toward the photosensitive drums 11 charged by the chargers 12 of the respective imaging units 10Y through 10K, in accordance with a drive signal supplied from the controller 50. By doing so, the exposure unit 15 irradiates the photosensitive drums 11, and performs exposure scanning. By this exposure scanning, electrostatic latent images are formed on the respective photosensitive drums 11 of the imaging units 10Y through 10K.

In each of the imaging units 10Y through 10K, the electrostatic latent image formed on the photosensitive drum 11 of the imaging unit is developed by the developer of the developing part 13, so that a toner image in the color corresponding to the imaging unit is formed on the photosensitive drum 11.

In each of the imaging units 10Y through 10K, the toner image formed on the photosensitive drum 11 is transferred onto the intermediate transfer belt 21 in a primary transfer performed by the primary transfer roller facing the photosensitive drum 11 via the intermediate transfer belt 21. In this case, the imaging operations for the respective colors are performed at different times so that the toner images are transferred and superimposed on one another at the same position on the intermediate transfer belt 21.

In each of the imaging units WY through 10K, the cleaner 14 has a cleaning blade 14a in contact with the photosensitive drum 11, and removes residual toner from the photosensitive drum lit by scraping off the residual toner with the cleaning blade 14a. The residual toner is the toner that has not been transferred from the photosensitive drum 11 onto the intermediate transfer belt 21 at the time of the primary transfer, but remains on the photosensitive drum 11.

The sheet feeder 30 includes a sheet feeding cassette 31 that stores paper sheets S as an example of recording sheets, a feeding roller 32 that sends the paper sheets S out of the sheet feeding cassette 31 one by one onto a conveyance path 39, conveying rollers 33 that convey the paper sheets 5, and timing rollers 34 that convey each paper sheet S at the timing to send the conveyed paper sheet S to a secondary transfer position 25a where the secondary transfer roller 25 is in contact with the intermediate transfer belt 21. These rollers are rotationally driven by the rotational driving force of a driving motor M2.

The timing rollers 34 convey a paper sheet S to the secondary transfer position 25a in synchronization with the time at which the superimposed toner images in time Y through K colors transferred onto the intermediate transfer belt 21 are conveyed to the secondary transfer position 25a. When the paper sheet S passes through the secondary transfer position 25a, the toner images on the intermediate transfer belt 21 are transferred onto the paper sheet S in a secondary transfer performed by the secondary transfer roller 25.

The paper sheet Son which the toner images are transferred in the secondary transfer at the secondary transfer position 25a is conveyed to the fixing unit 40. The residual toner that has not been transferred from the intermediate transfer belt 21 onto the paper sheet S at the time of the secondary transfer but remains on the intermediate transfer belt 21 is conveyed to a cleaner 28 as the intermediate transfer belt 21 goes around. The residual toner is then scraped off from the intermediate transfer belt 21 by the blade 28a of the cleaner 28, and thus, is removed from the intermediate transfer belt 21.

The fixing unit 40 is disposed above the secondary transfer position 25a, and includes a heating roller 41 and a pressure roller 42 pressed against the heating roller 41. The paper sheet S conveyed by the secondary transfer roller 25 is inserted into a fixing nip formed by the heating roller 41 and the pressure roller 42, so that the toner image (unfixed image) on the paper sheet S is thermally fixed by heat and pressure. The heating roller 41 is maintained at a predetermined fixing temperature (170° C., for example) required for the fixing with the heat generated from a heater 43.

The paper sheet S having passed through the fixing unit 40 is ejected out of the printer 2 by ejecting rollers 45, and is stored in a sheet catch tray 46.

Toner hoppers 18Y, 18M, 18C, and 18K are disposed at positions above the intermediate transfer unit 20 in the interior (inside the apparatus) of the printer 2.

The toner hopper 18K supplies a replenishment toner of the K color from a toner bottle 17K that contains 41) the replenishment toner of the K color, to the developing part 13 of time imaging unit 10K.

The toner bottle 17K has a shape elongated in a direction perpendicular to the plane of the drawing, and is supported by the toner hopper 18K so as to be rotatable in the direction of an arrow D about the axis along the longitudinal direction. The toner bottle 17K is rotated by the rotational driving force of a stirring motor 19K. As the toner bottle 17K is rotated, the K color toner stored in the toner bottle 17K flows out of the toner bottle 17K little by little through an opening 171 while being stirred, and enters the toner hopper 18K. The K color toner that has entered the toner hopper 18K is temporarily stored in the toner hopper 18K, and the amount of toner necessary for replenishment passes through a replenishing pipe 8K (indicated by dashed lines) from the toner hopper 18K. Thus, the necessary amount of K color toner is supplied to the developing part 13 of the imaging unit 10K.

Like the toner hopper 18K, the other toner hoppers 18Y, 18M, and 18C are rotated by the corresponding stirring motors 19Y, 19M, and 19C for the respective toner bottles 17Y, 17M, and 17C that contain replenishment toners of the corresponding colors. From these toner bottles 17Y, 17M, and 17C, the replenishment toners are supplied to the developing parts 13 of the corresponding imaging units 10Y, 10M, and 10C.

A temperature and humidity detection sensor 16 for detecting the in-machine temperature and humidity of the printer 2 is provided at a position beside the exposure unit 15. The results of detection performed by the temperature and humidity detection sensor 16 are used in an auto transfer voltage control (ATVC) process for determining the optimum value of the transfer bias voltage. The ATVC process will be described later in detail.

Further, a fan motor 29 is provided slightly above the intermediate transfer belt 21. To prevent the temperature inside the machine from becoming too high due to the heat generated from the fixing unit 4t) in the machine, the fan motor 29 discharges air out of the machine through an outlet port (not shown) While taking in air from the outside the machine (indoor) and sending the air into the machine through an inlet port (not shown).

Figure 2:
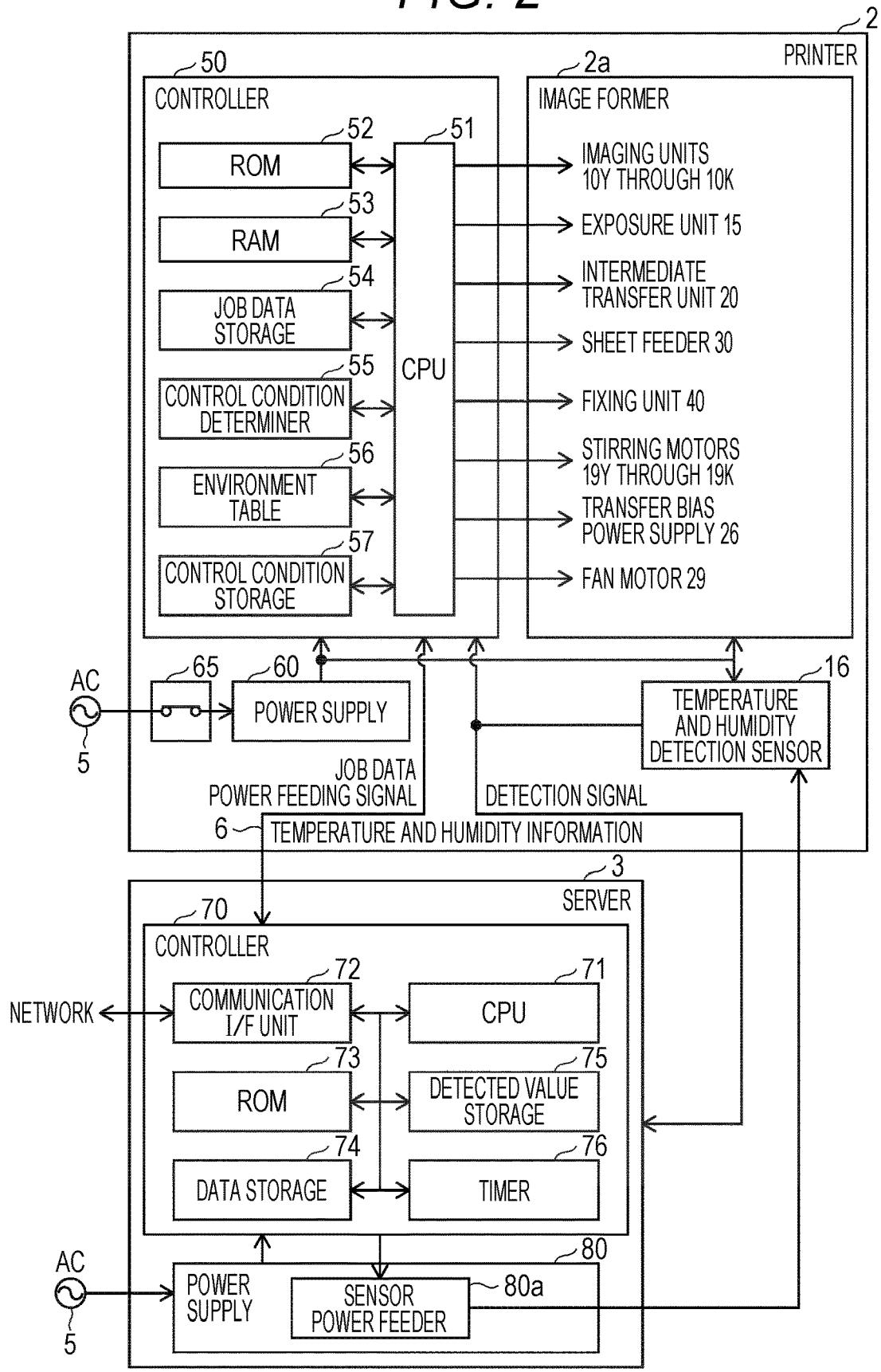
FIG. 2 is a block diagram showing the configurations of the controller of a printer and the controller of a server.

(2) Configurations of the Controller of the Printer and the Controller of the Server FIG. 2 is a block diagram showing the configurations of the controller 50 of the printer 2 and the controller 70 of the server 3.

As shown in the drawing, the controller 50 of the printer 2 includes a central processing unit (CPU) 51, a read only memory (ROM) 52, a random access memory (RAM) 53, a job data storage 54, a control condition determiner 55, an environment table 56, and a control condition storage 57. These components can communicate with one another.

The CPU 51 controls the imaging units 10Y through 10K, the exposure unit 15, the intermediate transfer unit 20, the sheet feeder 30, the fixing unit 40, the stirring motors 19Y through 19K, the transfer bias power supply 26, the fan motor 29, and the like, so that a print job is smoothly executed. The ROM 52 stores the program necessary for controlling the respective components such as the imaging units 10Y through 10K, and the program is read out by the CPU 51. The RAM 53 is used as a work area for the CPU 51.

In the printer 2, the principal components related to image formation, except for the controller 50, the power supply 60, a power switch 65, and the temperature and humidity detection sensor 16, constitute an image former 2a. For example, a group formed with the imaging units WY through 10K, the exposure unit 15, the intermediate transfer unit 20, the sheet feeder 30, the fixing unit 40, the stirring motors 19Y through 19K, the transfer bias power supply 26, the fan motor 29, the driving motors M1 and M2, and the like constitute the image former 2a.

The job data storage 54 stores data (such as image data to be used in image formation) of a print job sent from the server 3, and the data is read by the CPU 51 at the time of execution the mint job.

The control condition determiner 55 determines the transfer bias voltage obtained by the ATVC process as a control condition for the image former 2a. The ATVC process is a control process for determining the optimum value of the transfer bias voltage in accordance with the electric resistance of the secondary transfer roller 25, a paper sheet S, or the like, which changes with the environment in the machine. The ATVC process is performed as described below, immediately after the power supply to the printer 2 is turned on.

Specifically, a voltage is applied to the secondary transfer roller 25 by the transfer bias power supply 26. At this point of time, the output voltage of the transfer bias power supply 26 is variably controlled so that the current supplied to the secondary transfer roller 25 becomes a constant current of a predetermined magnitude. This control is referred to as the application of a constant current and a voltage.

In the state where the constant current and the voltage are applied to the secondary transfer roller 25, the voltage Vd of the secondary transfer roller 25 is detected with the voltmeter 26a (FIG. 1). Further, in accordance with the current values detected by the temperature and humidity detection sensor 16, and temperature and humidity information (described later) during a power-off period sent from the server 3, the environment step indicating the magnitude of the electric resistance of the secondary transfer roller 25, the paper sheet S, or the like is determined from the environment table 56.

FIG. 3 is a diagram showing the contents of the environment table 56 in which three environment steps (α, β, and γ) are stored in association with three humidity ranges. A slope A and an offset value B (V) are further associated with each environment step. The slope A and the offset value B are determined in advance as values to be used in the "equation" shown below.

At the time of an actual secondary transfer, not only the electric resistance value of the secondary transfer roller 25 but also the moisture absorption state of the paper sheet S greatly affects image quality. Therefore, slopes A (A1 through A3) and offset values B (B1 through B3) are specified as parameters for environment steps having certain correlations with the moisture absorption state. These values are set through experiments and the like. A value such as 30% as a humidity range is an example, and each environment step should be associated with two or more different humidity ranges.

In accordance with the detected voltage value Vd of the secondary transfer roller 25 and the determined environment step, a transfer bias voltage Vt is determined from the expression (equation) shown below.

$$\text{Transfer bias voltage } Vt \text{ (V)} = \text{detected voltage value } Vd \text{ (V) of secondary transfer roller } 25 \times \text{slope } A + \text{offset value } B \text{ (V)} \quad \text{(equation)}$$

The value of the transfer bias voltage Vt calculated according to this "equation" is stored in the control condition storage 57 shown in FIG. 2 as a control condition to be used in the subsequent print jobs.

It should be noted that the ATVC process is not necessarily performed immediately after the power supply is turned on, and may be performed at the start of a print job or during continuous printing, for example.

The power supply 60 (a first power supply) receives electric power output from an external commercial power supply (an external power supply) 5 via the power switch 65 provided in the printer 2, and supplies the controller 50, the image former 2a, and the temperature and humidity detection sensor 16 with electric power converted to the voltage necessary for each operation.

The power switch 65 is a switch that is switched on and off by user operations. When the power switch 65 is switched on, the power of the external power supply 5 is supplied from the power supply 60 to the controller 50, the image former 2a, and the temperature and humidity detection sensor 16. When the power switch 65 is switched off, the power of the external power supply 5 is not supplied to the power supply 60, and therefore, the power is not supplied to the controller 50, the image former 2a, and the temperature and humidity detection sensor 16, either. Hereinafter, switching on the power switch 65 will be referred to as switching on the power supply, and switching off the power switch 65 will be referred to as switching off the power supply.

The CPU 51 of the controller 50 starts a warming up when power feeding from the power supply 60 is started as the power supply is switched on. The warming up is the control to perform predetermined preparatory operations so as to enter a ready state in which printing (image formation) can be performed, and is an example of the above-mentioned start-up of the apparatus.

The preparatory operations include the following operations, for example. (i) The lighting of the heater 43 is started, and the heating roller 41 is heated to the fixing temperature. (ii) Driven by the driving motor M1, the photosensitive drum 11, the intermediate transfer belt 21, and the like rotate for a certain period, of time, so that the operation is checked. (iii) The results of detection performed by the temperature and humidity detection sensor 16 are received. (iv) The rotation of the fan motor 29 is started, and the toner bottles 17Y through 17K are rotated by rotation of the stirring motors 19Y through 19K, so that the toners are stirred. After completion of these preparatory operations is detected, the warming up is ended, and the process moves on to a ready state.

In a case where there is a print job to be executed at the time of the transition to the ready state, the print job is started. In a case where there are no print jobs to be executed, and an execution request is received in the ready state, the corresponding print job is started.

Since the CPU 51 operates with electric power supplied from the power supply 60, it is possible to determine that power feeding from the power supply 60 has been started as the power supply has been switched on, or power feeding front the power supply 60 has been stopped (cut off) as the power supply has been switched off. The CPU 51 then sends a power feeding signal (ON/OFF) indicating switching between power feeding and power cutoff to the server 3 through an exclusive line 6.

The controller 70 of the server 3 includes a CPU 71, a communication interface (I/F) unit 72, a ROM 73, a data storage 74, a detected value storage 75, and a tinter 76, and these components can communicate with one another. These components ranging from the CPU 71 to the timer 76 are mounted on a board 79 (FIG. 1). Further, the controller 70 is communicably connected to the controller 50 of the printer 2 via the exclusive line 6.

The communication interface unit 72 is an interface such as a LAN card or a LAN board for connecting to a network such as a LAN, and communicates with an external terminal device connected thereto via the network.

The data storage 74 temporarily stores the data of a print job received by the communication interface unit 72 from the external terminal device via the network. While the power switch 65 of the printer 2 is on, the data of the print job stored in the data storage 74 is transmitted to the controller 50 of the printer 2 via the exclusive line 6. The transmitted data is stored into the job data storage 54 of the printer 2.

The CPU 71 collectively controls the communication interface unit 72 to the tinter 76, to smoothly perform predetermines processes as a server, such as a process of transmitting and receiving various kinds of data such as print jobs and e-mail sent via the network, storing of the data, and transfer of the data to the printer 2. The CPU 71 also receives a power feeding signal (ON/OFF) sent from the controller 50 of the printer 2 via the exclusive line 6, to determine that the power switch 65 of the printer 2 is turned on or off.

The power supply 80 (a second power supply) of the server 3 converts the electric power output from the external commercial power supply (external power supply) 5 into a voltage necessary for operation of the controller 70, and outputs the voltage to the controller 70. Here, the power supply 80 is always connected to the external power supply 5, and the power supply 80 constantly supplies power to the controller 70 so that the server 3 is constantly in operation. Thus, the server 3 can accept print jobs and e-mail at any time via the network.

The power supply 80 has a sensor power feeder 80a that converts the electric power supplied from the commercial power supply 5 to a voltage necessary for operation of the temperature and humidity detection sensor 16 of the printer 2, and the power supply 80 then outputs the voltage. The sensor power feeder 80a switches on and off the outputting of the converted voltage in accordance with an instruction from the controller 70.

Specifically, upon receipt of a power feeding signal (OFF) from the controller 50 of the printer 2, the controller 70 instructs the sensor power feeder 80a to output the voltage. As a result, electric power is supplied from the power supply 80 to the temperature and humidity detection sensor 16 of the printer 2. Upon receipt a power feeding signal (ON) from the controller 50 of the printer 2, on the other hand, the controller 70 instructs the sensor power feeder 80a to stop the outputting of the voltage. As a result, the power feeding from the power supply 80 to the temperature and humidity detection sensor 16 of the printer 2 is stopped. In this sense, the power supply 80 can be regarded as both the power supply for the server 3 and the power supply that feeds electric power to the temperature and humidity detection sensor 16.

While the power supply is off, power feeding from the power supply 60 to the temperature and humidity detection sensor 16 is not performed, but power feeding from the power supply 80 of the server 3 to the temperature and humidity detection sensor 16 is performed. While the power supply is on, power feeding from the power supply 60 to the temperature and humidity detection sensor 16 is performed, and power feeding from the power supply 80 of the server 3 to the temperature and humidity detection sensor 16 is stopped. With this arrangement, the temperature and, humidity detection sensor 16 can perform detection at any time, regardless of whether or not the power supply to the primer 2 is on.

The reason for this configuration is as follows. Specifically, even during a power-off period of the printer 2, operation of the temperature and humidity detection sensor 16 is continued with the power feeding from the server 3, which is constantly in operation, and changes in the ambient environments are detected. When the power supply is switched on next time, the control condition (the above described transfer bias voltage) to be used in the print jobs to be executed thereafter is then determined from the results of the detection performed by the temperature and humidity detection sensor 16 during the last power-off period. The determination method used herein will be described later.

FIG. 4A is a schematic diagram showing the power feeding from the power supplies 60 and 80 to the respective components when the power supply to the printer 2 is on. FIG. 4B is a schematic diagram showing the power feeding from the power supplies 60 and 80 to the respective components when the power supply to the printer is off.

In a case where the power supply is on as shown in FIG. 4A, in the printer 2, electric power is supplied from the power supply 60 to the controller 50, the image former 2a, and the temperature and humidity detection sensor 16 (see the heavy lines).

The period during which this power feeding is performed is referred to as a power feeding period, and power feeding to the temperature and humidity detection sensor 16 is also performed. Thus, the environments (the temperature and the humidity) in the machine are detected by the temperature and humidity detection sensor 16, and the detection signals are sent to the controller 50 of the printer 2. From the results of the detection performed by the temperature and humidity detection sensor 16, the controller 50 can obtain the current temperature and humidity in the machine. In the server 3, electric power is supplied from the power supply 80 to the controller 70, but no electric power is supplied to the temperature and humidity detection sensor 16 of the printer 2 (see the dashed line).

After the power supply is switched off as shown in FIG. 4B, on the other hand, the electric power from the external power supply 5 is not supplied to the power supply 60 in the printer 2, and therefore, the power supply 60 is turned off. As a result, the power feeding to the controller 50, the image former 2a, and the temperature and humidity detection sensor 16 is stopped. This period during which power feeding is not performed is referred to as a power feeding suspension period (a power-off period). In the server 3, while the power feeding from the power supply 80 to the controller 70 is continued, power feeding from the power supply 80 to the temperature and humidity detection sensor 16 of the printer 2 is performed.

As described above, the CPU 71 of the server 3 recognizes that the power supply to the printer 2 is switched off, receiving a power feeding signal (OFF) from the controller 50. Therefore, upon receipt of a power feeding signal (OFF), the CPU 71 of the server 3 instructs the power supply 80 to perform power feeding to the temperature and humidity detection sensor 16 of the printer 2, while receiving detection signals from the temperature and humidity detection sensor 16 at certain sampling intervals (1-minute intervals or 5-minute intervals, for example) measured by the timer 76. Every time a detection signal is received, temperature and humidity information that associates the detected value with the reception (detection) time is stored into the detected value storage 75 (FIG. 2).

FIG. 5 is a diagram showing an example of a table 99 in which the temperature and humidity information is stored in the detected value storage 75. In the table 99, detection times are associated with detected values. Every time a detected value is received, the detection time and the value detected at the detection time are written into the table 99 one by one.

When the power supply to the printer 2 is switched on, a power-off period ends, and the state shown in FIG. 4B returns to the state shown in FIG. 4A. A power feeding period then starts. The controller 70 of the server 3 recognizes that the power supply to the printer 2 has been switched on, receiving a power feeding signal (ON) from the controller 50 of the printer 2.

When the power-on period starts, the controller 70 of the server 3 transmits the "power-off period temperature and humidity information" received during the last power-off period and stored in the detected value storage 75, to the controller 50 of the printer 2 (as indicated by the dot-and-dash line arrow in FIG. 4A). The controller 50 of the printer 2 performs an ATVC process, using the "power-off period temperature and humidity information" received from the server 3.

(3) Method of Determining the Environment Step to Be Used in an ATVC Process

Figure 6:
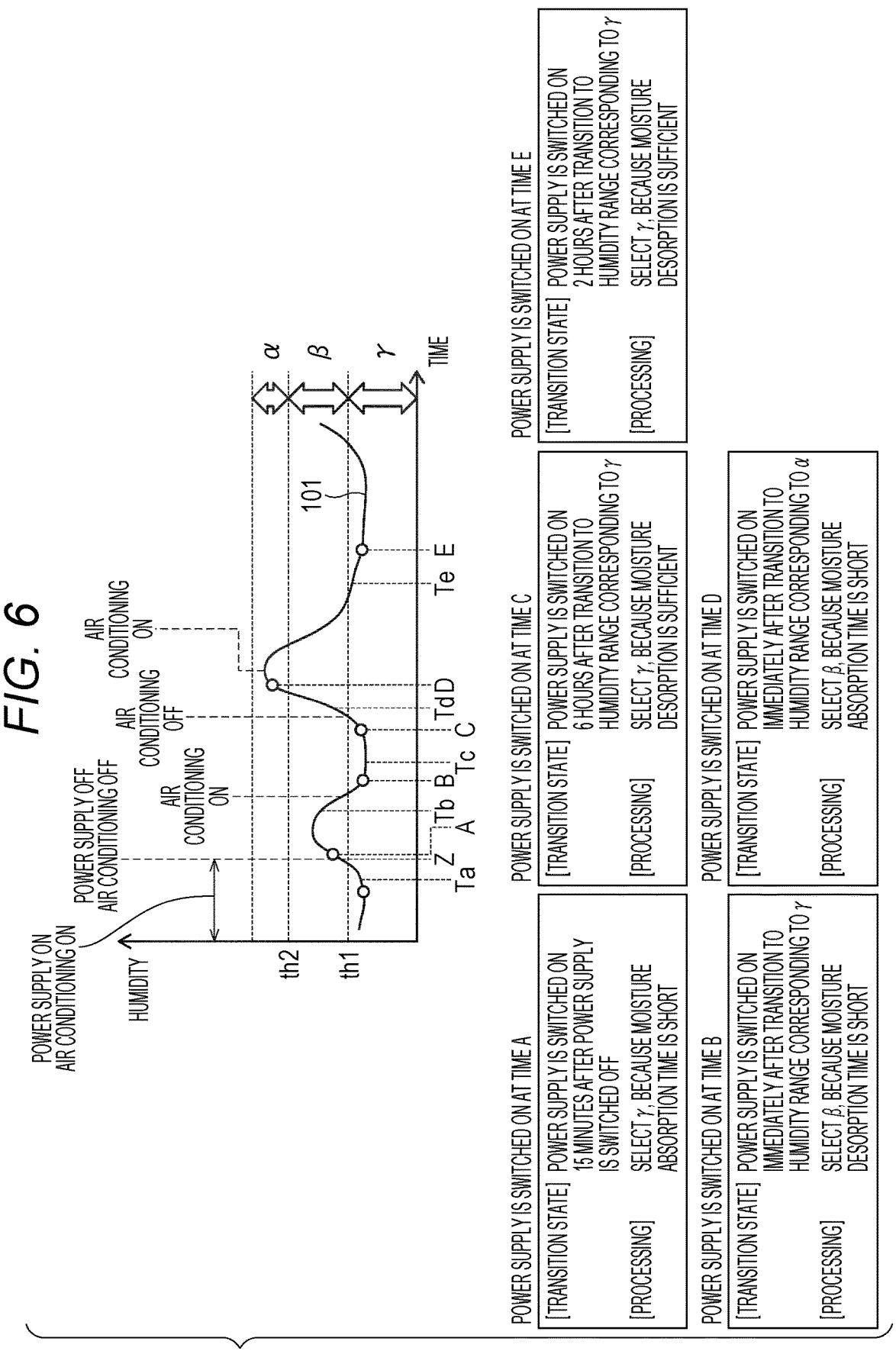
FIG. 6 is a diagram for explaining a method of determining the environment step to be used in an ATVC process.

FIG. 6 is a diagram for explaining a method of determining the environment step to be used in an ATVC process. In FIG. 6, a graph 101 shows an example of changes in the in-machine humidity over time. The abscissa axis indicates time, and the ordinate axis indicates the humidity (%) in the printer 2. Hereinafter, the air conditioning (cooling and heating) being on at the location where the image forming apparatus 1 is installed will be referred to as "the air conditioning being on", and the air conditioning being off will be referred to as "the air conditioning being off".

Humidity values th1 and th2 (>th1) on the ordinate axis indicate the reference thresholds to be used for switching among the environment steps α, β, and γ. In the example shown in FIG. 3, a threshold th1 corresponds to a humidity of 30%, and a threshold th2 corresponds to a humidity of 60%.

The graph 101 in FIG. 6 shows changes in the in-machine humidity in a case where the power supply and the air conditioning are switched on during a period before a time Z, the power supply and the air conditioning are switched off at the time Z, and the air conditioning is switched oil and off several times while the power supply remains off as time passes after the time Z.

For example, the power supply might be switched from a power-off state to a power-on state at a time A, which is 15 minutes after the time Z. In this case, the in-machine humidity at the time A is higher than that at the time Z because the air conditioning is off, and is in a humidity range in which the environment step β is applied, as can be seen from the graph 101.

Warming up of the printer 2 is started at the time A when the power supply is switched on. However, the humidity in the room has become higher, because the air conditioning has been turned off. Therefore, if only the value detected by the temperature and humidity detection sensor 16 at the time A is used, the environment step can be determined to be β.

However, the time A is only 15 minutes after the time Z at which the power supply and the air conditioning are switched off, and, between a past time Ta that is one hour before the time A and the time Z, the humidity range is a low-humidity range in which the environment step γ is applied. Therefore, at the time A, which is 15 minutes after the time Z, the moisture absorption by the secondary transfer roller 25 and the paper sheet S is still in a state in which the environment step γ should be applied, and is highly likely not yet to be in a state in which the environment step β corresponding to a higher humidity than this humidity should be applied. This is because the moisture absorption and the moisture desorption by the secondary transfer roller 25 and the paper sheet S normally progress more slowly than change in the ambient temperature and humidity.

For this reason, in the ATVC process that is performed immediately after the power supply is switched on at the time A, the transfer bias voltage as a control condition can be determined at a more appropriate value in a case where the environment step γ is applied instead of the environment step β.

That is, in the ATVC process for determining the control condition (the transfer bias voltage) to be used in the print job to be executed immediately after the power supply is switched on, a control condition that reflects the actual moisture absorption (the magnitudes of the electric resistances) of the secondary transfer roller 25 and the paper sheet S at a time when the power supply is on can be determined in a more accurate manner in a case where the environment step is determined from changes in the environment during the power-off period till a past time that is a predetermined time before the power supply is switched on, than in a case where the environment step is determined only from the value detected by the temperature and humidity detection sensor 16 at a time when the power supply is on.

Although the method of determining the environment step (α, β, or γ) to be used in the ATVC process will be described later in detail, the method can be summarized as follows.

In a case where the magnitude of the humidity change between a time when the power supply is switched on and a past time a predetermined time (one hour, for example) before the power-on time in a power-off period falls within a predetermined range, the environment step is determined to be the environment step corresponding to the value currently detected by the temperature and humidity detection sensor 16 at the power-on time (case (a)). In a case where the magnitude of the humidity change falls outside the predetermined range, the environment step is determined to be the environment step corresponding to a humidity that is one level higher (case (b)), or is determined to be the environment step corresponding to a humidity that is one level lower (case (c)).

For example, in a case where the environment step corresponding to the current detected value is the environment step β, the environment step corresponding to the one-level higher humidity is the environment step α, and the environment step corresponding to the one level lower humidity is the environment step γ. In a case where the environment step corresponding to the current detected value is the environment step α, there are no environment steps corresponding to any higher humidity, and therefore, the environment step corresponding to the one-level higher humidity is also the environment step α. Likewise, in a case where the environment step corresponding to the current detected value is the environment step γ, there are no environment steps corresponding to any lower humidity, and therefore, the environment step corresponding to the one-level lower humidity is also the environment step γ.

In a case where the power supply is switched on at the time A in the example shown in FIG. 6, the above case (c) is applied, and accordingly, the environment step to be used in the ATVC process to be performed immediately after the power supply is switched on is determined to be the environment step γ.

In a case where the power supply is switched on at the time B, instead of the time A, the environment step is determined as follows. The in-machine humidity at the time B is lowered to the humidity range in which the environment step γ is applied, as the air conditioning is switched on between the time B and a past time Tb one hour before the time B. However, the time B is a time immediately after a transition to the humidity range in which the environment step γ is applied, and the humidity range at the past time Tb one hour before the time B is the humidity range in which the environment step γ is applied. After that, the humidity became lower as the air conditioning was switched on, but not a long time has passed since the air conditioning was switched on. Therefore, it cannot be said that the moisture desorption by the secondary transfer roller 25 and the paper sheet S has progressed so much. In other words, it is highly likely that the secondary transfer roller 25 and the paper sheet S still have humidities in the humidity range in which the environment step β is applied. Because of this, the environment step is determined to be the environment step β.

Likewise, in a case where the power supply is switched on at the time C instead of the time A or B, the time C is the time six hours after the transition to the humidity range in which the control condition γ is applied, and the in-machine humidities at the time C and a past time Tc one hour before the time C fall within the humidity range in which the environment step γ is applied. In this case, the environment step is determined to be the environment step γ, because the moisture desorption by the paper sheet S is sufficient.

In a case where the power supply is switched on at a time D, instead of any of the times A through C, the humidity at the time D falls within the humidity range in which the environment step α is applied, but, at a past time Td one hour before the time D, the humidity falls within the humidity range in which the control condition β is applied. Although the humidity has rapidly increased during the one hour from the time Td at which the air conditioning was turned off, the moisture absorption by the secondary transfer roller 25 and the paper sheet S progresses with a delay, and, therefore, the moisture absorption does not progress at the same speed as the increase in temperature. Because of this delay in the moisture absorption by the paper sheet S, the environment step for the time D is determined to be the environment step β.

In a case where the power supply is switched on at a time E instead of any of the times A through D, the time E is the time two hours after the transition to the humidity range in which the control condition γ is applied, and the in-machine humidities at the time E and a past time Te one hour before the time E fall within the humidity range in which the control condition γ is applied. Therefore, the environment step is determined to be the environment step γ, because the moisture desorption by the paper sheet S is sufficient.

FIG. 7 is a diagram for explaining five patterns of methods of determining the environment step in accordance with the change in the in-machine humidity over the period from a past time to the current time.

In the drawing, "3 hours earlier", "2 hours earlier", and "1 hour earlier" indicate past times before the current time, and "current humidity" indicates the humidity currently detected by the temperature and humidity detection sensor 16.

In a pattern 1, a power-on state has been maintained for the past three hours till the current time. Although not shown, the past humidity is 30%, which is the same as the current humidity. In patterns 2 through 5, a power-off state has been maintained for the past three hours till the current time, and the power supply is currently on. In each of the patterns 2 through 5, the humidity has changed over the period from three hours earlier till the current time.

In the case of the pattern 1, the current humidity is 30%, and the difference (humidity difference) from the humidity at a past time a predetermined time (one hour in this case) before the current time is 0. Therefore, the environment step is determined to the reference environment step γ corresponding to the current humidity of 30%, according to the table shown in FIG. 3.

In the case of the pattern 2, the current humidity is 30%, and the humidity at the past time one hour before the current time is also 30%. Accordingly, the humidity difference is 0, and the environment step is determined to the environment step γ, as in the pattern 1. The pattern 2 corresponds to a case where the power supply is switched on at the time C and the time E shown in FIG. 6.

In the case of the pattern 3, the current humidity is 30%, but the humidity at the past time one hour earlier is 50%. Therefore, the humidity difference is −20. The larger the negative difference, the shorter the moisture desorption time of the paper sheet S, as in a case where the power supply is switched on at the time B shown in FIG. 6. In the example shown in FIG. 7, the absolute value of the humidity difference is equal to or greater than a predetermined threshold that is 5, for example. Therefore, the environment step is determined to be the environment step β corresponding to the humidity range one level higher than the reference environment step γ corresponding to the current humidity of 30%.

In the case of the pattern 4, the current humidity is 60%, but the humidity at the past time one hour earlier is 30%. Therefore, the humidity difference is +30. The larger the positive difference, the shorter the moisture absorption time of the paper sheet S as in a case where the power supply is switched on at the time D shown in FIG. 6, due to a rapid humidity rise that has occurred immediately before the time D. In the example shown in FIG. 7, the absolute value of the humidity difference is equal to or greater than a predetermined threshold that is 5, for example. Therefore, the environment step is determined to be the environment step β corresponding to the humidity range one level lower than the reference environment step a corresponding to the current humidity of 60%.

In the case of the pattern 5, the current humidity is 40%, but the humidity at the past time one hour earlier is 30%. Therefore, the humidity difference is +10. In the pattern 5, the humidity difference is smaller than that in the pattern 4, but the moisture absorption time of the paper sheet S is not as short as that in a case where the power supply is switched on at the time A shown in FIG. 6. In the example shown in FIG. 7, the absolute value of the humidity difference is equal to or greater than a predetermined threshold that is 5, for example. Therefore, the environment step is determined to be the environment step γ corresponding to the humidity range one level lower than the reference environment step β corresponding to the current humidity of 40%.

Figure 8:
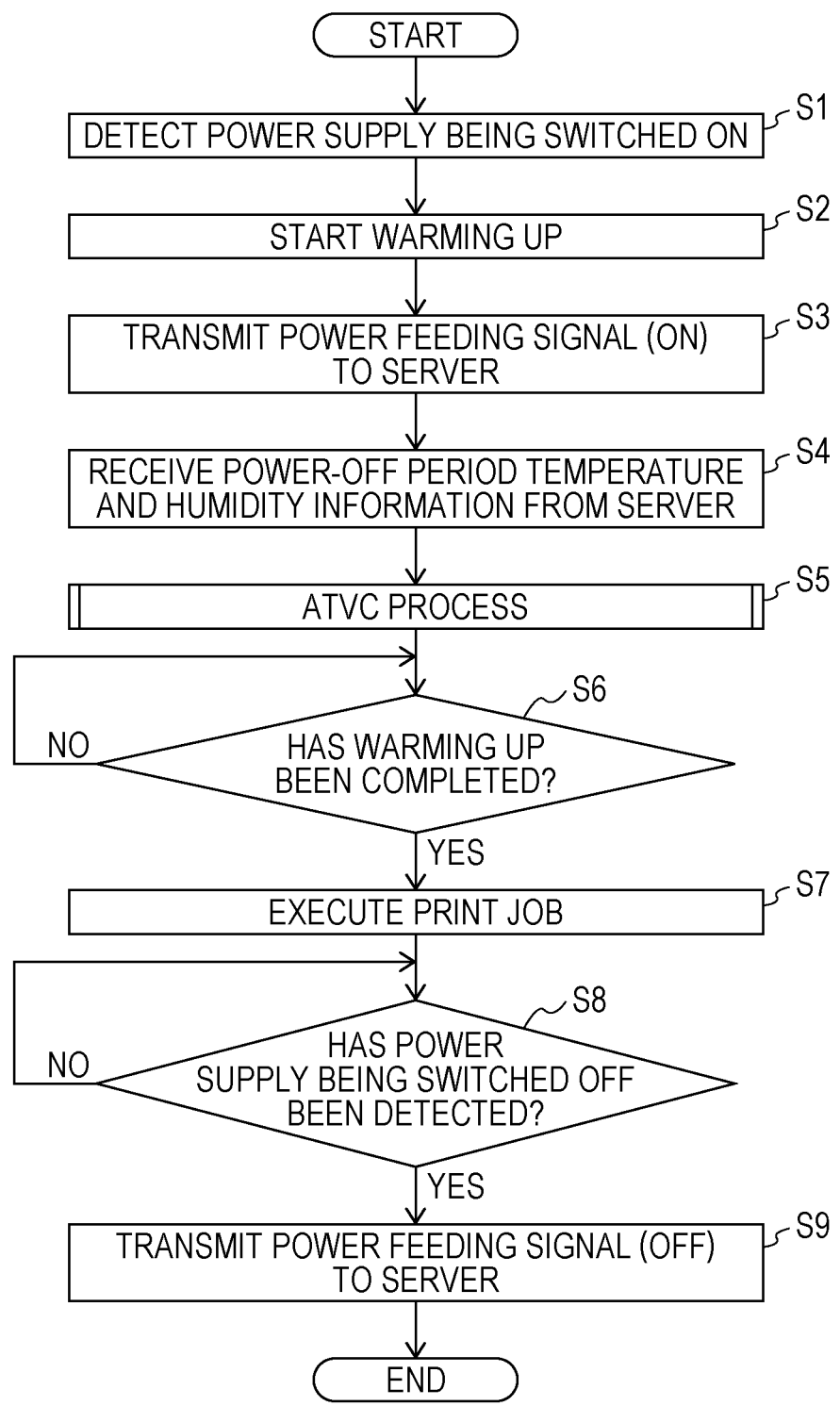
FIG. 8 is a flowchart showing a specific process to be performed by the controller of the printer.

(4) Processes to be Performed by the Controller of the Printer and the Controller of the Server FIG. 8 is a flowchart showing a specific process to be performed by the controller 50 of the printer 2.

As shown in the flowchart, when the power supply being switched on is detected (step S1), warming up is started (step S2). The switching on of the power supply is detected by the CPU 51 of the controller 50 detecting a start of power feeding from the power supply 60, as the power switch 65 is switched on.

A power feeding signal (ON) indicating that power feeding has been started is then transmitted to the controller 70 of the server 3 (step S3). In response to the transmission of the power feeding signal (ON) to the server 3, the power-off period temperature and humidity information transmitted from the controller 70 of the server 3 (step S25 in FIG. 10, which will be described later) is received (acquired) (step S4). This power-off period temperature and humidity information corresponds to the information stored in the table 99 shown in FIG. 5.

An ATVC process using the received temperature and humidity information is then performed (step S5).

Figure 9:
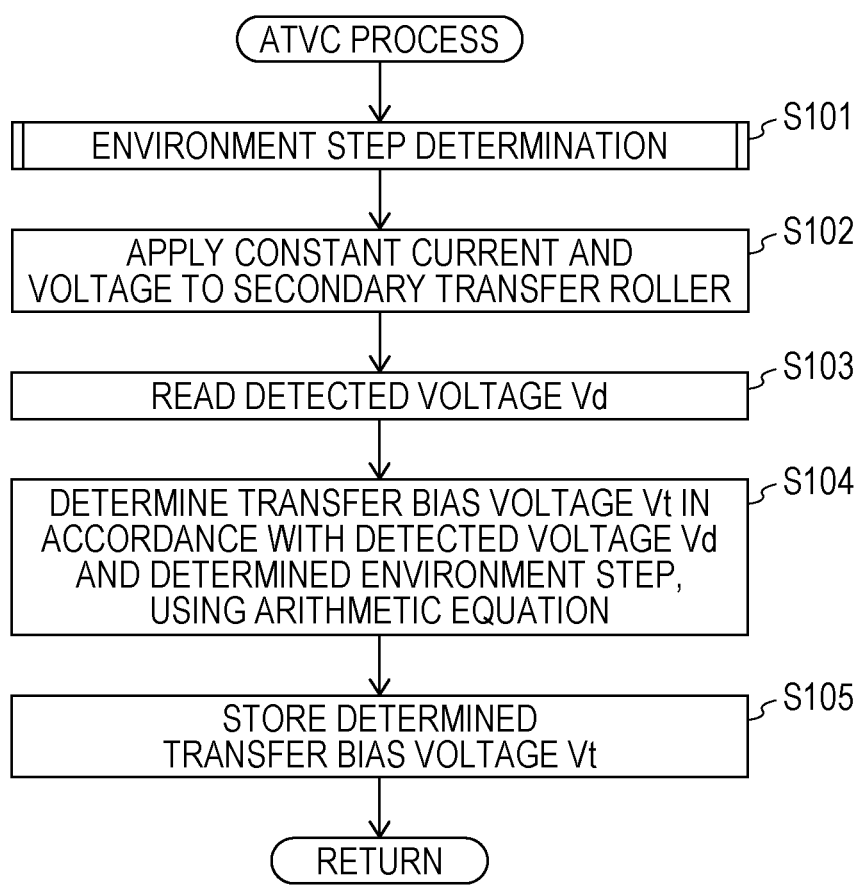
FIG. 9 is a flowchart showing the contents of a subroutine of the ATVC process.

FIG. 9 is a flowchart showing the contents of a subroutine of the ATVC process.

As shown in the flowchart, an environment step determination process is performed (step S101). The environment step determination processing will be described later in detail.

The transfer bias power supply 26 is controlled to apply a constant current and voltage to the secondary transfer roller 25 (step S102), and the voltage Vd of the secondary transfer roller 25 detected by the voltmeter 26a is read in (step 103). In accordance with the detected voltage Vd and the environment step determined in step 101, the value of the transfer bias voltage Vt to be used in the print jobs to be executed thereafter is determined with the use of the above "equation" (step S104). After the determined value of the transfer bias voltage Vt is stored as the control condition into the control condition storage 57 (step S105), the process returns to the main routine.

Referring back to FIG. 8, after the ATVC process is performed (step S5), if it is determined that the warming up has been completed ("Yes" in step S6), the machine enters a ready state. In a case where there is a print job to be executed, the print job is executed in accordance with the control condition set by the ATVC process in step S5 (step S7). Specifically, the transfer bias power supply 26 is controlled so that the transfer bias voltage to be applied to the secondary transfer roller 25 has the value set for the transfer bias voltage. As a result, a constant current having a predetermined magnitude as a target flows into the secondary transfer roller 25, and an optimum secondary transfer is performed.

A check is then made to determine whether the power supply being switched off has been detected (step S8). The switching off of the power supply is detected by the CPU 51 of the controller 50 detecting a stop of the power feeding from the power supply 60, as the power switch 65 is switched off.

If it is determined that switching off of the power supply has been detected ("Yes" in step S8), a power feeding signal (OFF) indicating that the power feeding has been stopped is transmitted to the controller 70 of the server 3 (step S9), and the process then comes to an end.

Figure 10:
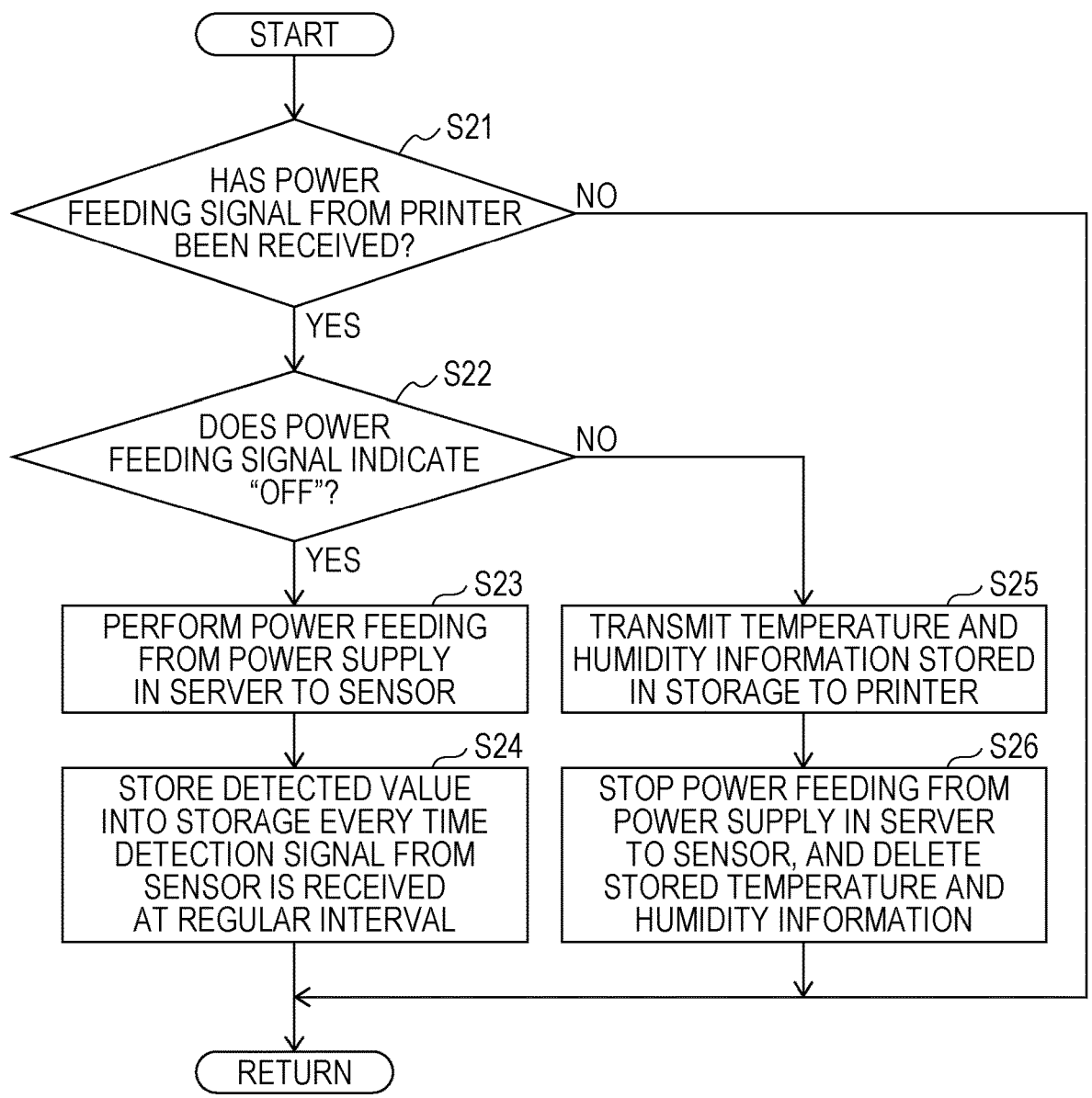
FIG. 10 is a flowchart showing a specific process to be performed by the controller of the server.

FIG. 10 is a flowchart showing a specific process to be performed by the controller 70 of the server 3, and this process is performed as a subroutine of a main routine (not shown) at regular time intervals.

As shown in the flowchart, a check is made to determine whether a power feeding signal transmitted from the printer 2 has been received (step S21). If it is determined that a power feeding signal has not been received ("No" in step S21), the process returns to the main routine. If it is determined, that a power feeding signal has been received ("Yes" in step S21), the process moves on to step S22.

If it is determined that a power feeding signal (OFF) is received ("Yes" in step S22) in a case where there are power feeding signals (ON) and power feeding signals (OFF), the power supply 80 is instructed to perform power feeding from the power supply 80 to the temperature and humidity detection sensor 16 of the printer 2 (step S23). After that, detection signals from the temperature and humidity detection sensor 16 are received at constant sampling intervals until the next power feeding signal (ON) is received. Every time a detection signal is received, temperature and humidity information that associates a detected value with a detection time is stored into the detected value storage 75 (step S24). The process then returns to the main routine.

If it is determined that a power feeding signal (ON) has been received ("No" in step S22), on the other hand, the temperature and humidity information currently stored in the detected value storage 75 is read out, and is transmitted as the power-off period temperature and humidity information to the controller 50 of the printer 2 (step S25).

The power supply 80 is then instructed to stop the power feeding from the power supply 80 to the temperature and humidity detection sensor 16 of the printer 2, and further the temperature and humidity information stored in the detected value storage 75 is deleted (step S26). The process then returns to the main routine.

Figure 11:
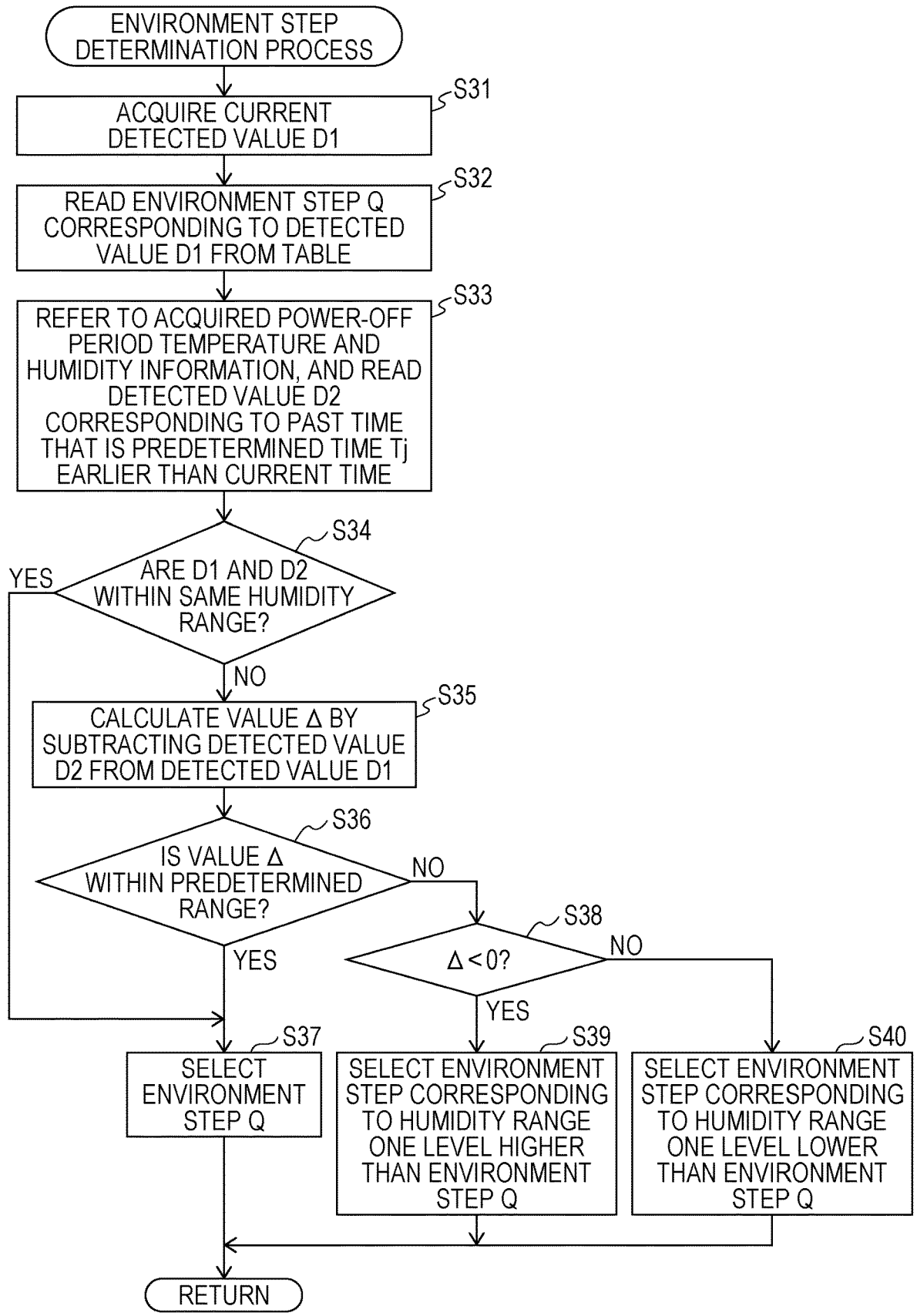
FIG. 11 is a flowchart showing the contents of the subroutine of an environment step determination process.

FIG. 11 is a flowchart showing the contents of the subroutine of the environment step determination process.

As shown in the flowchart, the value D1 currently detected by the temperature and humidity detection sensor 16 of the printer 2 is acquired (step S31). This detected value is a detected humidity value. The environment step Q corresponding to the detected value D1 is read from the environment table 56 (step S32). If the detected value D1 is 30%, for example, the environment step Q is the environment step γ according to the table shown in FIG. 3.

The power-off period temperature and humidity information acquired in the above step S4 is then referred to, and the detected value D2 (a humidity value) corresponding to a past time that is a predetermined time Tj earlier than the current time is read out (step S33). In FIG. 5, for example, if the past time that is the predetermined time Tj earlier than the current time is a detection time t3, a detected value X3 is read out.

A check is then made to determine whether the detected values D1 and D2 are in the same humidity range (step S34). A case where the detected, values D1 and D2 are in the same humidity range corresponds to the pattern 2 shown in FIG. 7, for example.

If the detected values D1 and D2 are determined to be within the same humidity range ("Yes" in step S34), the environment step is determined to be the above mentioned environment step Q (step S37), and the process then returns to the main routine.

If the detected values D1 and D2 are determined not to be within the same humidity range ("No" in step S34), on the other hand, a value Δ (=D1–D2) is calculated by subtracting the detected value D2 from the detected value D1 (step S35), and a check is made to determine whether the calculated value Δ falls within a predetermined range (–5 to +5, for example) (step S36). If the current humidity of 30% in the pattern 3 shown in the example in FIG. 7 is the detected value D1, and the humidity of 50% one hour before the current time is the detected value D2, the value Δ is –20. If the current humidity of 40% in the pattern 5 is the detected value D1, and the humidity of 30% one hour before the current time is the detected value D2, the value Δ is +10.

If the value Δ is determined to be within the predetermined range ("Yes" in step S36), the environment step is determined to be the above mentioned environment step Q (step S37), and the process then returns to the main routine.

If the value Δ is determined not to be within the predetermined range ("No" in step S36) and is a negative value ("Yes" in step S38), on the other hand, the environment step is determined to be the environment step corresponding to the humidity range one level higher than that of the above mentioned environment step Q (step S39). The process then returns to the main routine. This process corresponds to the case of the pattern 3 shown in FIG. 7.

If the value Δ is a positive value ("No" in step S38), the environment step is determined to be the environment step corresponding to the humidity range one level lower than that of the above mentioned environment step Q (step S40), and the process then returns to the main routine. This process corresponds to the cases of the patterns 4 and 5 shown in FIG. 7. In a case where the environment step Q is the environment step α, there are no higher humidity ranges than that as described above, and therefore, the environment step is determined to be the environment step α. In a case where the environment step Q is tile environment step γ, there are no lower humidity ranges than that as described above, and therefore, the environment step is determined to be the environment step γ.

In the above description, the environment step is determined in accordance with tile difference Δ between the current detected value D1 and the detected value D2 at the past time that is the predetermined time Tj earlier than the current time. However, this embodiment is not limited to this method. It is also possible to determine the environment step from the humidity change during the power-off period from a past time, such as three hours earlier, two hours earlier, or one hour earlier, as shown in FIG. 7, till the current time.

Specifically, in a case where the humidity change during a power-off period shows an upward tendency, the humidity during the power-off period is lower than the humidity in the current environment, and therefore, the environment step corresponding to the one-level lower humidity range is selected. In a case where the humidity change during a power-off period shows a downward tendency, the humidity during the power-off period is higher than the humidity in the current environment, and therefore, the environment step corresponding to the one-level higher humidity range is selected. The slope indicating the humidity change may be further taken into account when the environment step is determined. Such changes in the results of detection performed by the temperature and humidity detection sensor 16 during a power-off period, or changes in the environment, can also be used in the other embodiments that will be described later.

(5) ATVC Process After the Power Supply to the Printer is Switched On

In the above described example case shown in FIG. 8, the transfer bias voltage (control condition) set by the ATVC process in step S5 is used in the next print job after the warming up is completed (steps S6 and S7). However, the transfer bias voltage can also be used in a print job to be executed during a predetermined time Tg (15 minutes, for example) after the power supply is switched on.

Further, after the predetermined time Tg (15 minutes, for example) has passed since the power supply was turned on, an ATVC process may be newly performed, and a new transfer bias voltage (a new control condition) may be set. In such a case, the environment step determination is performed only with the value D1 currently detected by the temperature and humidity detection sensor 16. Specifically, the environment step corresponding to the current detected value D1 is read out from the environment table 56, and the read environment step is determined to be the environment step to be used.

For example, in a case where the secondary transfer roller 25 and the paper sheet S are moistened and contain large amounts of moisture due to a high humidity environment during the power-off period immediately before the power supply is switched on, the control condition for the print job to be executed immediately after the power supply is switched on is determined in accordance with changes in the environment during the power-off period as described above, so that a control condition that reflects the changes in the environment in the past can be used.

Meanwhile, after a certain period of time has passed since the power supply was switched on, the in-machine temperature and humidity also change because of the driving of the heater 43, the fan motor 29, and the like in the machine, changes in room temperature, and the like. As a result, moisture desorption of the secondary transfer roller 25 and the paper sheet S gradually progresses, and the amounts of moisture in the secondary transfer roller 25 and the paper sheet S return to the amounts suitable for the in-machine humidity detected at that time. In such a situation, it is possible to set a more suitable control condition by determining the control condition only from the value D1 currently detected by the temperature and humidity detection sensor 16.

In view of the above, a threshold indicating until when the control condition? determined from changes in the environmental in the past is be used as the predetermined time Tg after the power supply is switched on is determined through experiments or the like. In this manner, the control condition (transfer bias voltage) determined by an ATVC process can be changed depending on whether the time Tf elapsed since switching on of the power supply is longer than the predetermined time Tg.

As described above, in this embodiment, in a case where an ATVC process for determining the transfer bias voltage as the control condition for the image former 2a is performed immediately after the power supply is switched on, the transfer bias voltage can be determined in accordance with the changes in the environment during the power-off period immediately before the power supply is switched on. Accordingly, the quality of each formed image can be made higher than that in a case where the transfer bias voltage is determined only from the current detected value immediately after the power supply is switched on.

In a configuration in which an ATVC process is performed only after the states of the secondary transfer roller 25 and the paper sheet S become almost the same as the indoor condition after the power supply is switched on, the productivity of image formation jobs greatly drops. In this embodiment, however, such a drop in productivity does not occur, and the productivity of image formation jobs can be made higher than in such a configuration.

In the above described example of a start-up of the apparatus, an ATVC process is performed during the warming up immediately after the power supply is switched on. However, this embodiment is not limited to this. This embodiment can also be applied in a case where an ATVC process is performed, in a mode in which the power feeding state in the apparatus is substantially the same as that during a power-off period, or when the sleep mode is off.

Further, this embodiment can be applied not only to the transfer bias voltage to be used in a secondary transfer, but also to the transfer bias voltage to be used in a primary transfer.

In the above described example configuration, the detected value storage 75 is provided in the controller 70 of the server 3, and the results (temperature and humidity information) of detection performed by the temperature and humidity detection sensor 16 are stored in the detected value storage 75 during a power-off period. However, this embodiment is not limited to this configuration. Since the server 3 is constantly in operation, the temperature and humidity information may be temporarily stored in an external device such as an external server connected via a network, for example. When the server 3 detects switching on of the power supply of the printer 2, the server 3 may receive the stored temperature and humidity information from the external device via the network, and transmit the temperature and humidity information to the controller 50 of the printer 2.

In the above described example, the optimum transfer bias voltage is determined by an ATVC process. However, it is also possible to use a simple determination method as described below, for example.

Specifically, in-machine temperatures are divided into different temperature ranges, and transfer bias voltage values suitable for the respective temperature ranges are associated with the respective temperature ranges in advance.

After the power supply is switched on, the transfer bias voltage value corresponding to the temperature range to which the current temperature value detected by the temperature and humidity detection sensor 16 belongs is provisionally determined. If the difference between the current detected temperature value and the past temperature value detected during the last power-off period is within a predetermined range, the provisionally determined value is determined to be the transfer bias voltage value. If the difference exceeds the predetermined range, a transfer bias voltage value belonging to a temperature range one or more levels higher or lower than the temperature range to which the current detected temperature value belongs is determined in accordance with the exceeding amount, and the determined transfer bias voltage value is used instead of the provisionally determined value. Alternatively, in-machine humidities can be used, instead of in-machine temperatures.

Second Embodiment

In the above described example configuration of the first embodiment, a transfer bias voltage is determined as the control condition for the image former 2a by an ATVC process. In a second embodiment, the time (rotation time) of a process of rotating the toner bottles 17Y through 17K immediately after the power supply is switched on is determined as the control condition. In this aspect, the second embodiment differs from the first embodiment. To avoid repetition in the description below, the same aspects as those of the first embodiment will not be explained below.

Figure 12:
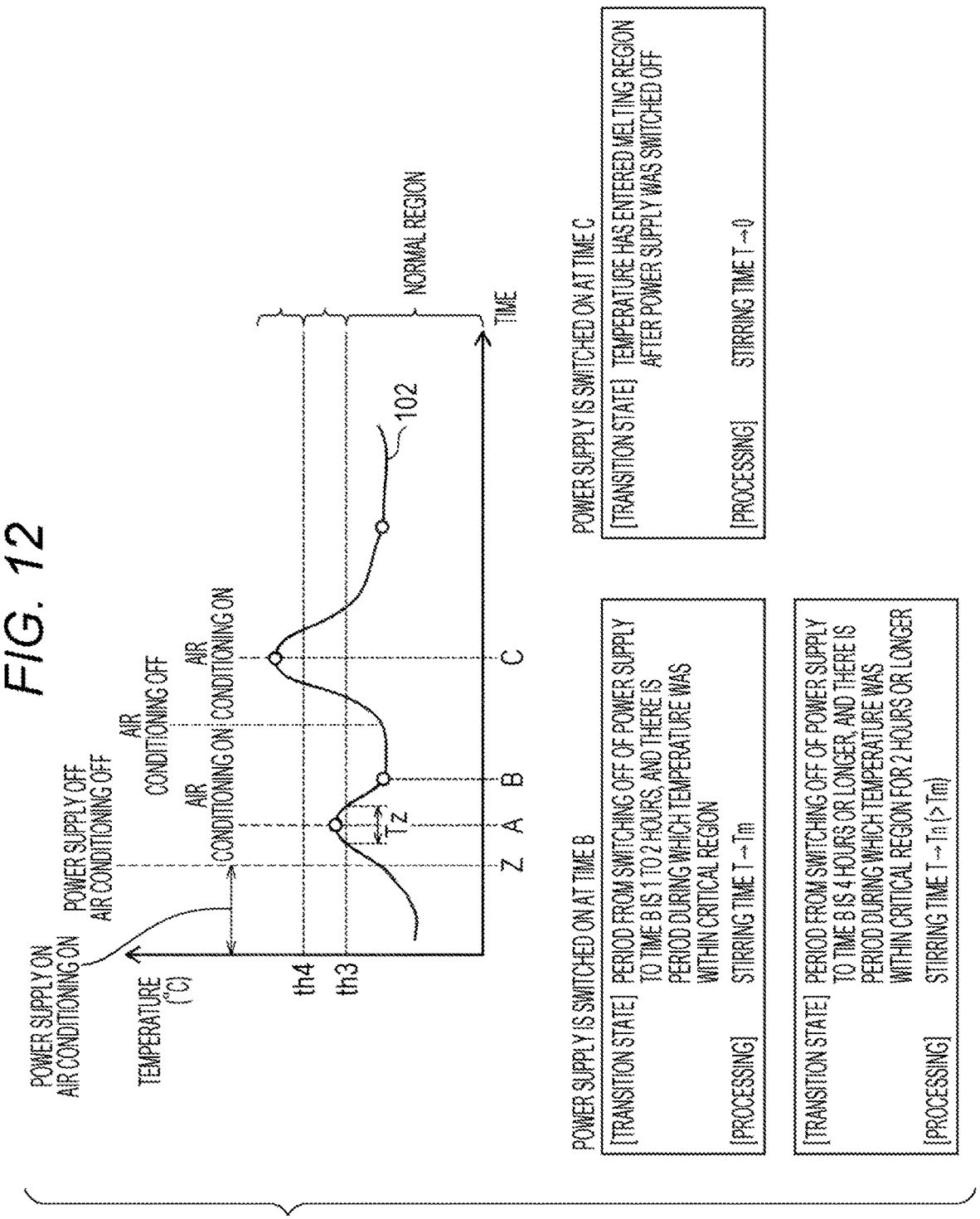
FIG. 12 is a diagram for explaining a method of determining a rotation time of a toner bottle according to a second embodiment.

FIG. 12 is a diagram for explaining a method of determining the rotation time of the toner bottle 17K. In FIG. 12, a graph 102 shows an example of changes in the in-machine temperature over time. The abscissa axis indicates time, and the ordinate axis indicates the temperature (° C.) in the printer 2.

In the replenishment toner contained in the toner bottle 17K, toner particles might adhere to one another due to softening that occurs as the in-machine temperature rises. Particularly, in a case where the inside of the machine stays at a high temperature for a long period of time after the air conditioning is turned off during a power-off period, a large number of toners adhere to one another, and turn into lumps. If a large number of toner particles in the form of lumps are supplied to the developing part 13, there is a possibility that the developing performance is degraded due to decreases in the fluidity and the chargeability of the developer contained in the developing part 13.

Even in a case where a large number of toner particles turn into lumps due to softening in the toner bottle 17K, if the toner bottle 17K is rotated for a certain period of time for stirring, the toner particles adhering to one another gradually separate from one another, and the lumps normally disappear in the end.

Therefore, the rotation time of the toner bottle 17K to be rotated when the power supply is switched on is determined as the control condition in accordance with the in-machine temperature at the time of the switching on of the power supply and the changes in temperature during the power-off period immediately before the switching on of the power supply. The toner bottle 17K is then rotationally controlled for the determined rotation time.

In FIG. 12, a temperature value th3 on the ordinate axis indicates the temperature at the boundary between a normal region and a toner melting critical region, and a temperature value th4 (>th3) on the ordinate axis indicates the temperature at the boundary between the toner melting critical region and a toner melting region. The toner melting critical region (a particular environment region) is a temperature region where toner particles easily form lumps due to softening of the toner particles, and the toner melting region is a temperature region where toner particles melt as if to be coagulated.

The graph 102 in FIG. 12 shows changes in the in-machine temperature in a case where the power supply and the air conditioning are switched on during a period before a time Z, the power supply and the air conditioning are switched off at the time Z, and the air conditioning is switched on and off several times while the power supply remains off as time passes after the time Z.

For example, after the time Z, the in-machine temperature Tp enters the toner melting critical region, and, after reaching a peak at a time A, the in-machine temperature Tp starts dropping to the normal region. At a time B at which the temperature Tp is in the normal region, the power supply state is switched from a power-off state to a power-on state.

In a case where the period from the time Z (power off) to the time B (power on) is approximately one to two hours, the period includes a period Tz (a cumulative value) during which the in-machine temperature Tp was in the toner melting critical region. However, the period Tz is not very long, and therefore, it is highly probable that clumping of the toner particles has not occurred yet. In this case, the stirring time T is determined to be a reference time Tin (one minute, for example).

In a case where the period from the time Z (power on) to the time B (power off) is approximately four to five hours, and the period Tz during which the in-machine temperature Tp was in the toner melting critical region has become two hours or longer in total, it is highly probable that clumping of the toner particles has started. In this case, the stirring time T is determined to be a time Tn (two minutes, for example) that is longer than the reference time Tin.

As the period Tz becomes longer, the clumping of the toner particles progresses faster. Therefore, the duration of the stirring time T can be set in accordance with the duration of the period Tz.

Since the in-machine temperature Tp at the time B at which the power supply is switched on is the normal region that is below a threshold th3, a stirring time T determined only from the in-machine temperature Tp becomes the reference time Tm. However, in a case where the period Tz is two hours or longer, for example, clumping of the toner particles in the toner bottle 17K probably has started in view of the temperature changes in the past during the power-off period immediately before the power supply is switched on. Accordingly, the stirring time T can be determined to be the time Tn that is longer than the reference time Tm.

With this, the toner bottle 17K is rotated for the time Tn that is longer than usual, so that the toner in the toner bottle 17K can be sufficiently stirred, and the clumping of the toner particles can be undone. For example, the stirring time T can be the reference time Tin in a case where the period Tz is shorter than 2 hours, and be the time Tn in a case where the period Tz is 2 hours or longer.

Where the period Tz is short, the toner stirring time does not need to be long, and the stirring motor 19K consumes less power accordingly. Where the period Tz is long, on the other hand, the toner stirring time is made longer so that the clumping of the toner can be undone.

In the above described example, the power supply is switched on at the time B. However, in a case where the power supply is switched on at the time A, for example, the stirring time T can be the reference time Tm if the total period in which the in-machine temperature Tp was in the toner melting critical region during the power-off period immediately before the time A is shorter than two hours. The stirring time T can be the time Tn if the total period in which the in-machine temperature Tp was in the toner melting critical region during the power-off period immediately before the time A is two hours or longer.

Further, in a case where the power supply is switched on at the time C instead of the time A or B, the in-machine temperature Tp is in the toner melting region (at a threshold th4 and higher). In this case, it is highly probable that the toner particles have clumped, and the clumping cannot be undone. Therefore, the stirring time is determined to be 0. In this case, any job execution is prohibited, and a notification to that effect is sent to the user via an operation unit (not shown) or the like.

The condition for setting the stirring time T at 0 may be that the in-machine temperature Tp has entered the toner melting region at least once during the power-off period immediately before the power supply is switched on.

In the above described example, the rotation process for the toner bottle 17K has been explained, but the same rotation process is performed for the other toner bottles 17Y through 17C. Hereinafter, the toner bottles 17Y through 17K will be collectively referred to as the toner bottle, unless the toner bottles 17Y through 17K need to be distinguished from one another.

Figure 13:
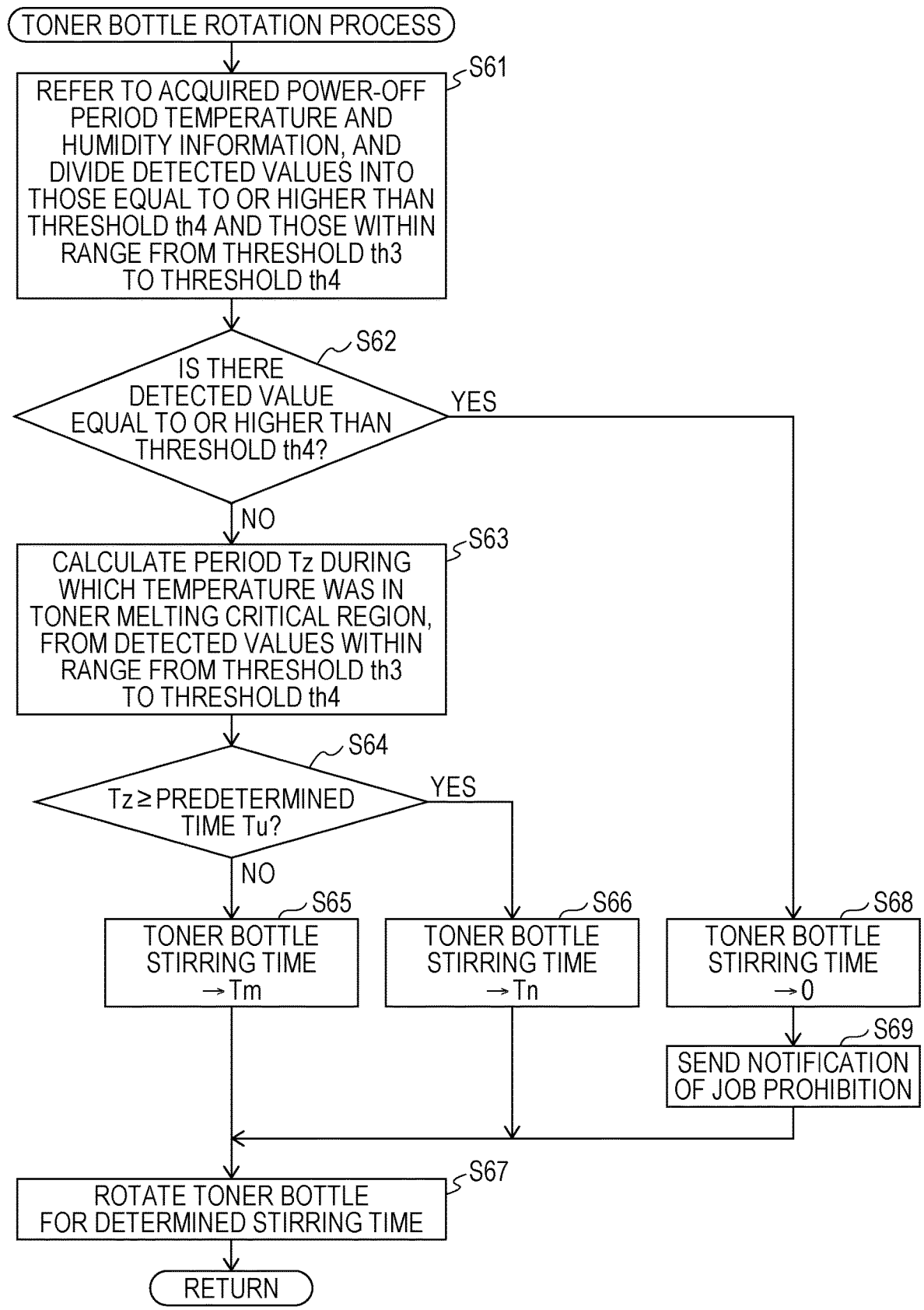
FIG. 13 is a flowchart showing a specific toner bottle rotation process.

FIG. 13 is a flowchart showing a specific toner bottle rotation process according to this embodiment. The controller 50 of the printer 2 performs this process in place of the ATVC process in step S5 shown in FIG. 8 according to the first embodiment.

As shown in FIG. 13, the power-off period temperature and humidity information obtained in the above described step S4 is referred to, and the detected values (in-machine temperature values) during the power-off period are divided into those equal to or higher than the threshold th4 and those between the threshold th3 and the threshold th4 (step S61).

In a case where there is a detected value equal to or higher than the threshold th4 ("Yes" in step S62), the stirring time T for the toner bottle is determined to be 0 (zero) (step S68). After notifying the user of job prohibition (step S69), the process moves on to step S67.

In a case where there are no detected values equal to or higher than the threshold th4 ("No" in step S62), the total period Tz during which the temperature was in the toner melting critical region (the particular environment region) is calculated from the detected value(s) within the range from the threshold th3 to the threshold th4 (step S63). Since the temperature and humidity information is information that associates detected values with detection times as described above, the total period during which the in-machine temperature was in the toner melting critical region can be calculated from the detection times associated with the respective detected values within the range from the threshold th3 to the threshold th4.

If the calculated period Tz is determined to be shorter than a predetermined time Tu (two hours in the above example) ("No" in step S64), the stirring time T for the toner bottle is determined to be the time Tm (step S65), and the process moves on to step S67. If the calculated period Tz is determined to be equal to or longer than the predetermined time Tn ("Yes" in step S64), the stirring time T for the toner bottle is determined to be the time Tn (>Tm) (step S66), and the process moves on to step S67.

In step S67, the toner bottle is rotated for the determined stirring time T (>0). By this rotation, the toner in the toner bottle is stirred. In a case where the stirring time T is determined to be 0 in step 68, rotation of the toner bottle is prohibited. After step 67, the process returns to the main routine.

In a case where the toner bottle rotation process for determining the stirring time for the toner bottle as the control condition for the image former 2a is performed immediately after the power supply is switched on, the stirring time can be determined in accordance with changes in the environment during the power-off period immediately before the power supply is switched on. Thus, the quality of each formed image can be improved.

In the above described example, the duration of the stirring time for the toner bottle is determined in accordance with the duration of the total period Tz during which the in-machine temperature was in the toner melting critical region during the power-off period. This concept can also be applied to the first embodiment.

Specifically, in FIG. 6, the power supply is switched on at the time B, and the time that is a predetermined time earlier than the switching on of the power supply is the time Tb. In this case, the environment step can be determined to be the environment step β or γ, in accordance with the duration of the period (the period from the time Tb to the next time at which the air conditioning is switched on in FIG. 6; this period is herein represented by Tx) during which the in-machine humidity is in the humidity range β during the power-off period from the time Tb to the time B.

The longer the period Tx, the longer the period during which the secondary transfer roller 25 and the paper sheet S are exposed to an environment with a higher humidity than the humidity range γ.

Therefore, in a case where the period Tx is shorter than a predetermined threshold (represented by Ty), for example, the environment step is determined to be the environment step γ corresponding to the current detected temperature Tp. In a case where the period Tx is equal to or longer than the predetermined threshold Ty, the environment step is determined to be the environment step β corresponding to a humidity environment one level higher than the environment step γ corresponding to the current detected temperature Tp, with the environment during the power-off period being taken into account. The same effects as above can also be achieved through such control.

Third Embodiment

In the above described example configuration of the second embodiment, the stirring time during which stirring is performed to undo clumping of the toner in the toner bottle is determined as a control condition. However, in a case where part of the toner existing in the replenishing pipe 8K connecting the toner hopper 18K and the developing part 13 is clumped due to the influence of a change in the environment during the power-off period, for example, the clumping of the toner in the replenishing pipe 8K cannot be undone by the stirring through rotation of the toner bottle. Therefore, if the clumped toner remains in the developing part 13 after supplied from the replenishing pipe 8K to the developing part 13, there is a possibility of deterioration of developing performance.

To prevent such deterioration of developing performance, a third embodiment provides a configuration in which the toner (including the supposedly clumped part of the toner) in the replenishing pipe 8K is temporarily conveyed to the developing part 13, and toner sweep control is then performed to forcibly sweep the toner out of the developing part 13.

Specifically, the toner sweep control is performed through the following procedures (a) through (c).

(a) A replenishing operation is performed to replenish new toner from the toner bottle 17K via the toner hopper 18K. As a result, the toner existing in the replenishing pipe 8K is pushed out of the replenishing pipe 8K by the new toner from the toner hopper 18K, and is supplied to the developing part 13. (b) At the same time, an electrostatic latent image corresponding to a high-density solid image is formed on the photosensitive drum 11 by charging and exposure, and the electrostatic latent image on the photosensitive drum 11 is developed with toner so that a solid toner image is formed on the photosensitive drum 11. In this manner, consumption of the toner in the developing part 13 is continued. (c) The toner image formed on the photosensitive drum 11 is then transferred, onto a rotating intermediate transfer belt 21 by a primary transfer, and is conveyed to the cleaner 28 without a secondary transfer. The toner image is removed by the cleaner 28, and the toner is recovered.

In a case where the photosensitive drum 11 and the intermediate transfer belt 21 are regarded as one image carrier, the toner sweep control can be regarded as a process of carrying the toner conveyed from the replenishing pipe 8K to the developing part 13 onto the image carrier, consuming the toner on the image carrier through development, and removing the toner on the image carrier with the cleaner 28.

As a result of this toner sweep control, even if clumped toner exists in the replenishing pipe 8K, at least part of the clumped toner is recovered by the cleaner 28 via the developing part 13, the photosensitive drum 11, and the intermediate transfer belt 21. Thus, it is possible to prevent deterioration of developing performance due to residual toner in the developing part 13.

Where the in-machine temperature during the power-off period is high, the toner in the replenishing, pipe 8K is more likely to clump, and the proportion of the clumped toner increases. Therefore, to sweep a larger amount of clumped toner out of the developing part 13, the execution time of the toner sweep control should be made longer. However, during the toner sweep control, any print job cannot be executed. Furthermore, the replenishment toner in the toner bottle 17K is consumed in the toner sweep control, which is not a print job.

For this reason, the minimum execution time required for the toner sweep control at a time of switching on of the power supply is set beforehand through experiments or the like. However, if the execution time is determined only from the in-machine temperature detected when the power supply is switched on, the influence of changes in the environment during the power-off period is not taken into consideration.

For example, the toner sweep control may not be performed in a case where the temperature detected when the power supply is switched on is in the normal region that is lower than the toner melting critical region. In such a configuration, even if part of the toner in the replenishing pipe 8K has clumped due to the long period during which the temperature was in the toner melting critical region during the last power-off period, the toner sweep control is not performed, and the developing performance might deteriorate.

Therefore, in the third embodiment, the execution time of the toner sweep control to be performed when the power supply is switched on is determined as a control condition, in accordance with the in-machine temperature detected at a time of switching on of the power supply and the changes in temperature during the last power-off period. The toner sweep control is performed only for the determined execution time. In this sense, like the above described toner bottle rotation process, the toner sweep control can be regarded as a predetermined operation to be performed by the image former 2a after a start of power feeding from the power supply 60 to the image former 2a as the power supply is switched on.

FIG. 14 is a diagram showing the contents of a control condition table 301 that associates detected temperatures with execution times (control conditions) of the toner sweep control.

In the example shown in the drawing, in a case Where the detected temperature Td (° C.) is lower than 30° C., the toner sweep control is not performed. In a case where the detected temperature Td (° C.) is not lower than 30° C. but is lower than 40° C., the execution time of the toner sweep control is one minute. In a case where the detected temperature Td (° C.) is 40° C. or higher, the execution time of the toner sweep control is two minutes. The control condition table 301 is created beforehand through experiments or the like, and is stored in a storage (not shown) in the controller 50.

FIG. 15 is a diagram for explaining four patterns of methods of determining the execution time of the toner sweep control in accordance with the changes in the in-machine temperature over the period from a past time to the current time.

In FIG. 15, "current temperature" indicates the temperature currently detected by the temperature and humidity detection sensor 16.

"Coverage" indicates the print coverage rate, and the ratio of the area of the entire image region formed on a paper sheet S to the area of the paper sheet S is expressed in percentage (%). In general, the coverage tends to be low in an image showing only text characters, and the coverage tends to be high in a halftone image such as a photograph. As information associated with coverages with respect to one paper sheet S is included in print job data, the coverage of the image to be formed on each paper sheet S in a print job to be executed can be obtained by referring to the information.

The coverage is used as one parameter in determining the execution time of the toner sweep control. The reason for this is as follows.

Although the execution time of the toner sweep control is one or two minutes depending on the in-machine temperature as described above, any print job cannot be executed during the toner sweep control to maintain the quality of each formed image. As a result, the start of the print job is delayed for one minute or longer after the power supply is switched on, and the user who has requested the print job is made to wait.

On the other hand, in a low-coverage image showing only text characters with a lower coverage than 10%, for example, even if the toner sweep control is not performed, the image quality is not affected as much as the image quality of a halftone image such as a photograph that is required to have high image quality. Therefore, only in a case where the coverage is used as a parameter in determining the execution time (control condition) of the toner sweep control, and the print job to be executed immediately after the power supply is switched on is for a low-coverage image, the toner sweep control is prohibited, and the print job is preferentially executed, regardless of the in-machine temperature. In this manner, the waiting time of the user can be shortened while the minimum necessary image quality is maintained in each formed image.

In a pattern 1, a power-on state has been maintained for the past three hours till the current time. Although not shown, the past temperature is 30° C., which is the same as the current temperature. In patterns 2 through 4, a power-off state has been maintained for the past three hours till the current time, and the power supply is currently on. In each of the patterns 2 through 4, the temperature has changed over the period from three hours earlier till the current time.

In the case of the pattern 1, the current temperature is 30° C., and the difference (temperature difference) between the current temperature and the temperature at a past time that is a predetermined time (one hour in this example) before the current time is 0. The coverage is equal to or higher than 10%, which is the threshold. Therefore, the execution time is determined to be one minute, which is the reference control condition (the reference execution time for the toner sweep control) corresponding to the current temperature of 30° C., according to the control condition table 301 shown in FIG. 14. The pattern 2 is the same as the pattern 1.

In the case of the pattern 3, although the current temperature is 30° C., the temperature at the past time one hour earlier is 40° C. The coverage is equal to or higher than 10%, which is the threshold. The temperature difference obtained by subtracting the temperature at the past time from the current temperature is −10. The larger the negative difference, the higher the in-machine temperature during the power-off period than the current temperature. In such an environment, toner clumping easily occurs in the replenishing pipe 8K. Therefore, a longer execution time than the reference execution time is used, in accordance with the absolute value of the temperature difference. In the pattern 3, the reference control condition (execution time) corresponding to the current temperature is one minute, but the execution time is determined to be two minutes, which is longer than the reference execution time.

In the case of the pattern 4, the coverage is lower than the threshold of 10%, and therefore, the execution time of the toner sweep control is determined to be 0 (the toner sweep control is prohibited), regardless of the in-machine temperature.

Figure 16:
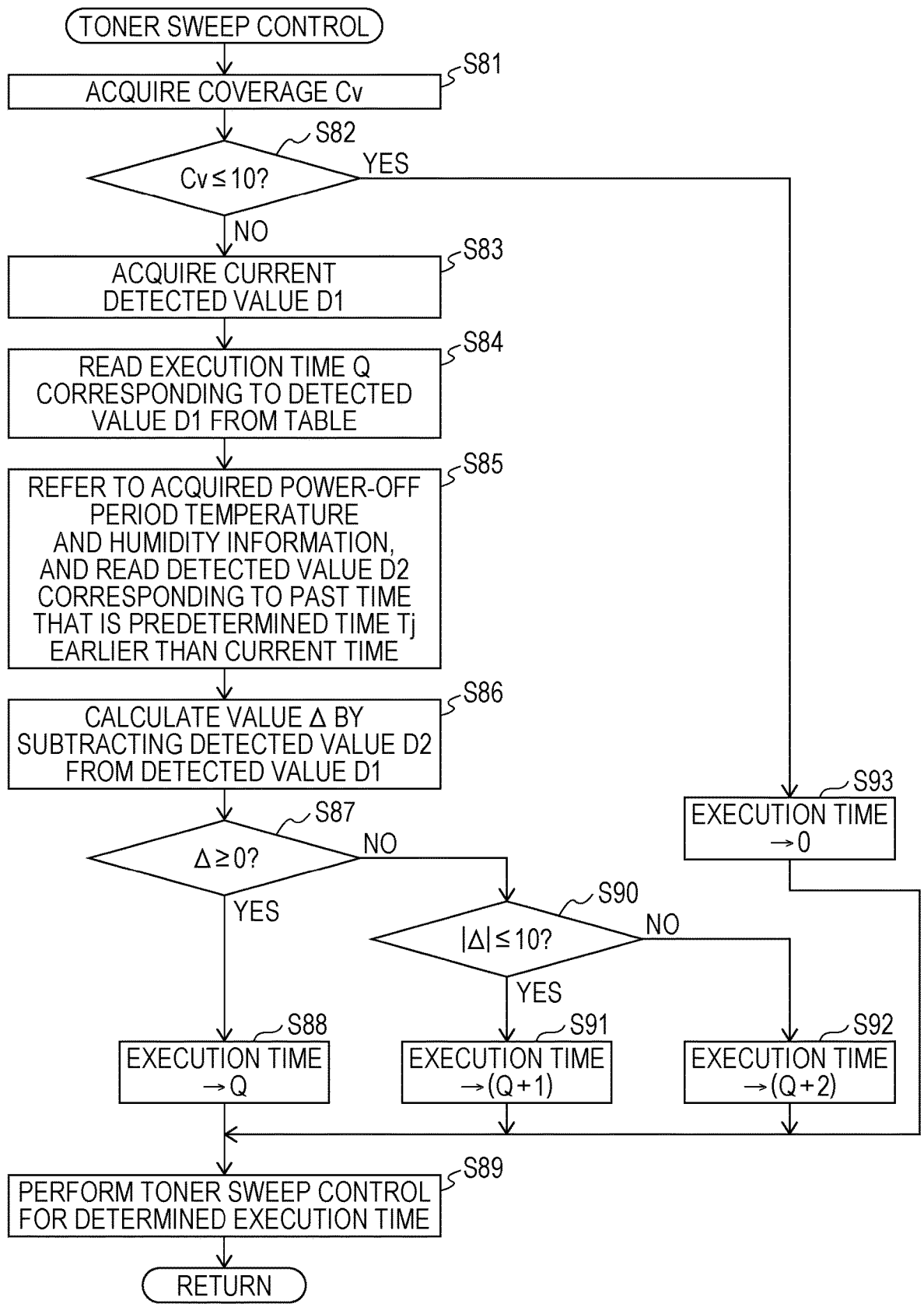
FIG. 16 is a flowchart specifically showing the process of the toner sweep control.

FIG. 16 is a flowchart specifically showing the process of the toner sweep control according to this embodiment. The controller 50 of the printer 2 performs this process in place of the ATVC process in the step S5 shown in FIG. 8 according to the first embodiment.

As shown in FIG. 16, the coverage Cv (%) in the image to be formed in the print job to be executed is acquired (step S81). In a case where printing is to be performed on more than one paper sheet S, the corresponding coverage Cv is acquired for each paper sheet S.

A check is made to determine whether the acquired coverage Cv is not higher than the threshold, which is 10% in this example (step S82). In a case where coverages Cv are acquired for the respective paper sheets S, a check is made to determine whether all tile coverages Cv are not higher than the threshold.

If the acquired coverage Cv is determined to be higher than the threshold ("No" in step S82), the value D1 currently detected by the temperature and humidity detection sensor 16 is acquired (step S83). This detected value is a detected temperature value. The sweep control execution time Q corresponding to the detected value D1 is then read from the control condition table 301 (step S84). For example, if the detected value D1 is 30° C., the execution time Q is one minute, according to the table shown in FIG. 14.

The power-off period temperature and humidity information (shown in FIG. 5) acquired in the above step S4 is then referred, to, and the detected value D2 (a temperature value) corresponding to the past time that is a predetermined time Tj earlier than the current time is read out (step S85). In a case where the predetermined time Tj is one hour, "30° C." is read out as the detected value D2 in the pattern 2 shown in FIG. 15, and "40° C." is read out in the pattern 4.

A value Δ (=D1−D2) is then calculated by subtracting the detected value D2 from the detected value D1 (step S86), and a check is made to determine whether the calculated value Δ is not smaller than 0 (step S87). If the calculated value Δ is not smaller than 0, there is the relationship expressed as "D1≥D2". Accordingly, the in-machine temperature during the past power-on period is lower than the current in-machine temperature. In the environment in this case, toner clumping does not occur during the past power-on period as easily as at the current time. Therefore, a toner sweep control execution time determined in accordance with the current temperature is more suitable for changes in the environment.

In view of the above, if the calculated value Δ is determined not to be smaller than 0 ("Yes" in step S87), the execution time of the toner sweep control is determined to be the above execution time Q (step S88), and the process moves on to step S89.

If the calculated value Δ is determined to be a negative value ("No" in step S87), a check is made to determine whether the absolute value of the calculated value Δ is not greater than the threshold, which is 10 (step S90). The greater the absolute value of the calculated value Δ, the higher the temperature during the last power-off period than the current temperature. In such an environment, toner clumping easily occurs, and therefore, it is preferable to set a long execution time for the toner sweep control.

Therefore, if the absolute value of the calculated value Δ is determined not to be greater than the threshold ("Yes" in step S90), the execution time of the toner sweep control is determined to be a time that is "one minute" longer than the above execution time Q (step S91), and the process moves on to step S89. If the absolute value of time calculated value Δ is determined to be greater than the threshold ("No" in step S90), the execution time of the toner sweep control is determined to be a time that is "two minutes" longer than the above execution time Q (step S92), and the process moves on to step S89.

Further, if tile acquired coverage Cv is determined not to be greater than the threshold ("Yes" in step S82), the execution tune of the toner sweep control is determined to be 0 (the toner sweep control is prohibited) (step S93), and the process moves on to step S89.

In step S89, the toner sweep control is performed for the determined execution time. As a result, even if clumped toner exists in the replenishing pipe 8K at a time when the power supply is switched on, the clumped toner can be swept out of the developing part 13 and be prevented from remaining in the developing part 13. In a case where the execution time of the toner sweep control is determined to be 0, the toner sweep control is prohibited. After step 89, the process returns to the main routine. After the return, step S6 and the following steps shown in FIG. 8 are carried out. In a case where the toner sweep control is performed, time execution of a print job in step S7 is started after the toner sweep control. In a case where the toner sweep control is prohibited, the toner sweep control is not performed, and the print job in step S7 is promptly started.

In a case where the toner sweep control is performed immediately after the power supply is switched on, an execution time can be determined as the control condition for the image former 2a, in accordance with the changes in the environment during the power-off period immediately before the power supply is switched on. Thus, the quality of each formed image can be improved.

In the above description, the toner sweep control for the developing part 13 of the imaging unit 10K has been explained. However, the same toner sweep control as that for the imaging unit 10K can also be performed for the developing parts 13 of the other image formers 10Y through 10C.

In the above described example configuration, whether to perform the toner sweep control is determined in accordance with the coverage Cv. However, the coverage Cv is not necessarily used. For example, the toner sweep control may be prohibited in the case of a formed image of a particular type whose quality is hardly affected by the prohibition of the toner sweep control, or a monochrome image as opposed to a color image. Specific examples of images of the particular type include a text image and a table image showing text characters and ruled lines.

Further, in a case where the toner sweep control is prohibited, the toner sweep control is not performed before the start of a print job. However, after the end of the print job, for example, the toner sweep control may be automatically performed for a determined execution time.

Alternatively, the toner sweep control may be performed, regardless of the coverage Cv. In this case, steps S81 and S82 are skipped (not carried out).

Fourth Embodiment

In the above described example configurations of the first through third embodiments, the in-machine temperature and humidity of the image former 2a and the like are detected with the temperature and humidity detection sensor 16 during a power-off period of the printer 2. In a fourth embodiment, on the other hand, changes in the ambient environment of the image former 2a due to heat generated from the server 3 during a power-off period are detected not with the temperature and humidity detection sensor 16 but from the operation status of the server 3. In this aspect, the fourth embodiment differs from the first through third embodiments.

As shown in FIG. 1, an image forming apparatus 1 has a structure in which a printer 2 is placed on a server 3. Regardless of whether the power supply to the printer 2 is on or off, the server 3 is constantly in operation, and heat generated from a controller 70 and a power supply 80 of the server 3 is easily transferred to the printer 2 located above the server 3. In this sense, the printer 2 can be regarded as being located at a suitable position to receive heat generated from the server 3.

The amount of heat generated from the server 3 varies depending on the operation status of the server 3. Specifically, as the load in communicating with an external terminal device via a network becomes greater, the process execution time (load factor) per unit time of each component, such as a CPU 71, a communication interface unit 72, and the like, becomes longer. The load factor also fluctuates depending on whether or not to perform processing, such as virus checking, system updating, data backup, or a simulation. As the load factor becomes higher, the throughput also becomes higher, and accordingly, a larger amount of heat is generated.

As the amount of heat generated from the server 3 operating during a power-off period of the printer 2 becomes larger, a larger amount of heat is transferred to the printer 2. As a result, the in-machine temperature of the printer 2 becomes higher. If the in-machine temperature of the printer 2 increases to the above described toner melting critical region, for example, the replenishment toner in the toner bottle and the toner existing in the replenishing pipe might clump.

Figure 17:
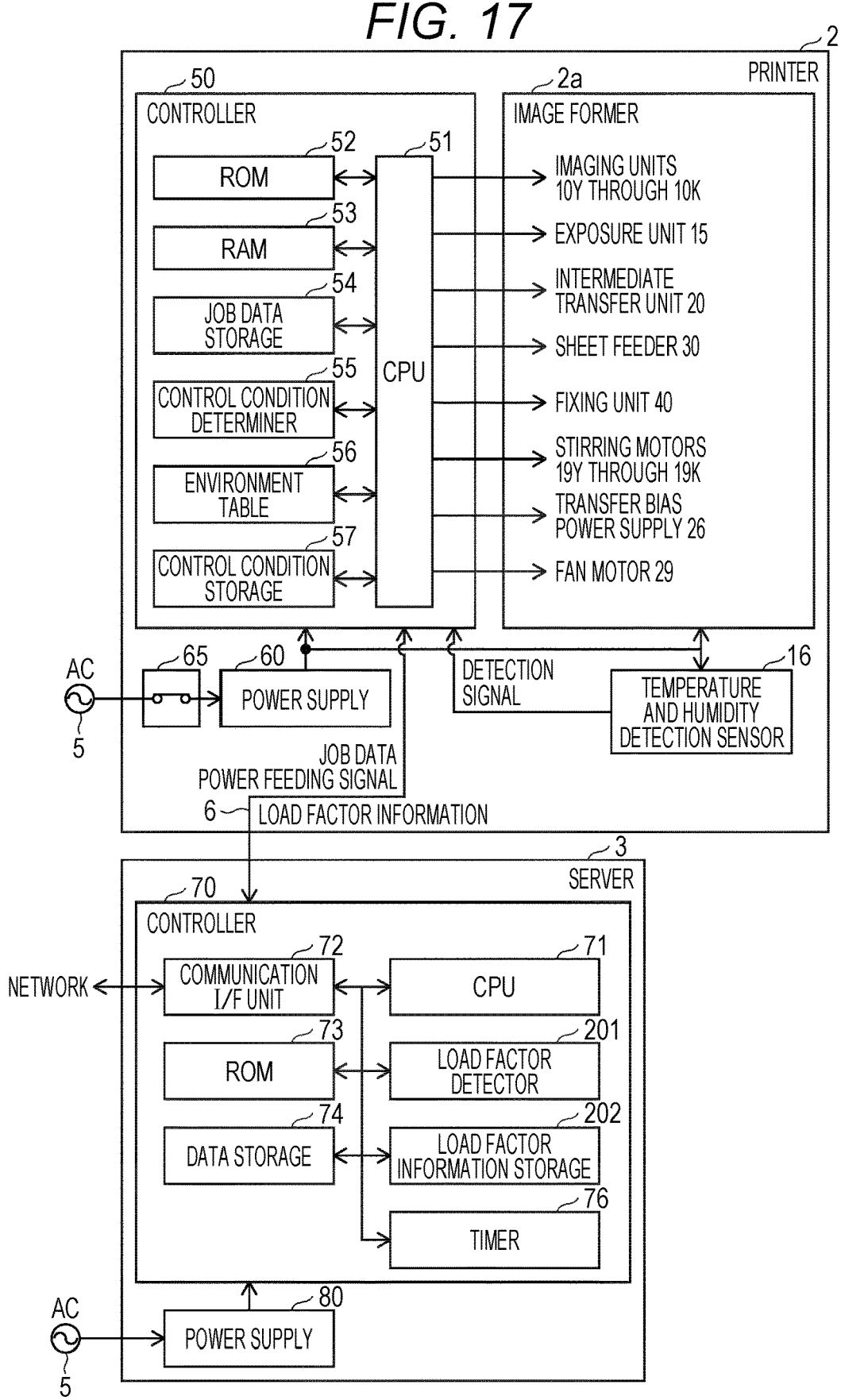
FIG. 17 is a block diagram showing the configuration of the controller of a server according to a fourth embodiment.

Therefore, in the fourth embodiment, a load factor detector 201 and a load factor information storage 202 are provided in the controller 70 of the server 3, as shown in FIG. 17. The load factor detector 201 detects the load factor of the server 3 at predetermined time intervals during a power-off period of the printer 2, and stores values indicating the detected load factors, together with the corresponding detection times, into the load factor information storage 202. Specifically, a table that associates the detected load factor values with the corresponding detection times, like the table 99 in FIG. 5, is provided. Information indicating the load factors is referred to as the power-off period server load factor information.

While the power supply to the printer 2 is on, the server 3 reads the power-off period server load factor information stored in the load factor information storage 202, and transmits the power-off period server load factor information to the printer 2. In turn, the printer 2 determines the control condition for the image former 2a, such as the execution time of the toner sweep control, by taking into account the load factor of the server 3 indicated by the power-off period server load factor information.

In the fourth embodiment, the changes in the ambient environment of the image former 2a during a power-off period of the printer 2 are detected from the results of detection of load factors detected not with the temperature and humidity detection sensor 16 but by the server 3. Therefore, as shown in FIG. 17, the power supply 80 of the server 3 is not designed to perform power feeding to the temperature and humidity detection sensor 16.

FIG. 18 is a diagram for explaining four patterns of methods of determining the execution time of the toner sweep control in accordance with the changes in the load factor of the server 3 over the period from a past time to the current time.

In the case of a pattern 1, the current temperature is 30° C., and the reference control condition (the reference execution time for the toner sweep control) corresponding to the current temperature of 30° C. is one minute, according to the control condition table 301 shown in FIG. 14. Meanwhile, the load factor of the server 3 at a past time than is a predetermined time (one hour in this example) before the current time is 30%, which is lower than a predetermined threshold (50%, for example). Because of the low load factor of 30% in the server 3 during the power-off period, the probability that toner clumping has occurred during, the power-off period due to heat from the server 3 is low. Accordingly, the control condition is determined to be one minute, which is the reference control condition (the reference execution time for the toner sweep control) corresponding to the current temperature of 30° C.

In the case of a pattern 2, the load factor of the server 3 was as high as 60% two hours before the current time, but, one hour earlier, the load factor had dropped to 30%, which is not higher than the predetermined threshold, as in the pattern 1. Therefore, the control condition is determined to be one minute, which is the reference control condition corresponding to the current temperature of 30° C., as in the pattern 1.

In the case of a pattern 3, the current temperature is 30° C., but the load factor of the server 3 one hour earlier is 60%, which is higher than the predetermined threshold. Accordingly, it is highly probable that, in such an environment, clumping of the toner in the replenishing pipe 8K easily occurs due to heat from the server 3 during a power-off period. Therefore, a longer execution time than the reference execution time is used in accordance with the magnitude of the difference Δ between the load factor of the server 3 and the predetermined threshold. In the pattern 3, the load factor of the server 3 is 60%, and the difference Δ front the predetermined threshold (=50%) is 10. Because the difference Δ is smaller than a predetermined value (20, for example), the control condition is determined to be two minutes, though the reference control condition (execution time) corresponding to the current temperature is one minute.

In the case of a pattern 4, the current temperature is 30° C., and the load factor of the server 3 one hour earlier is 90%. The difference Δ (=40) between the load factor of the server 3 and the predetermined threshold is much larger than the difference Δ (=10) in the case of the pattern 3, and is larger than the predetermined value (20, for example). Therefore, although the reference control condition (execution time) corresponding to the current temperature is one minute, the control condition is determined, to be three minutes, which is longer than the reference control condition.

From the relationship in which the in-machine temperature of the printer 2 rises as the load factor of the server 3 becomes higher (or the humidity changes as the temperature rises), how much the execution time is to be made longer than the reference control condition (execution time) corresponding to the current temperature (or the current humidity) can be determined beforehand through experiments or the like, in accordance with the magnitude of the load factor and changes in the load factor during the power-off period.

In other words, the load factor as the operation status of the server 3 corresponds to the environment variable around the image former that affects the image quality of each image formed by the image former 2a, and replaces the results of detection performed by the temperature and humidity detection sensor 16. Therefore, in the fourth embodiment, the temperature and humidity detection sensor 16 is not used for detecting the ambient temperature and the like of the image former 2a during a power-off period, but is used as a second detector that is activated by power feeding from the power supply 60 only when the power supply is on, and detects the temperature or the humidity around the image former 2a while the power supply is on.

Figure 19:
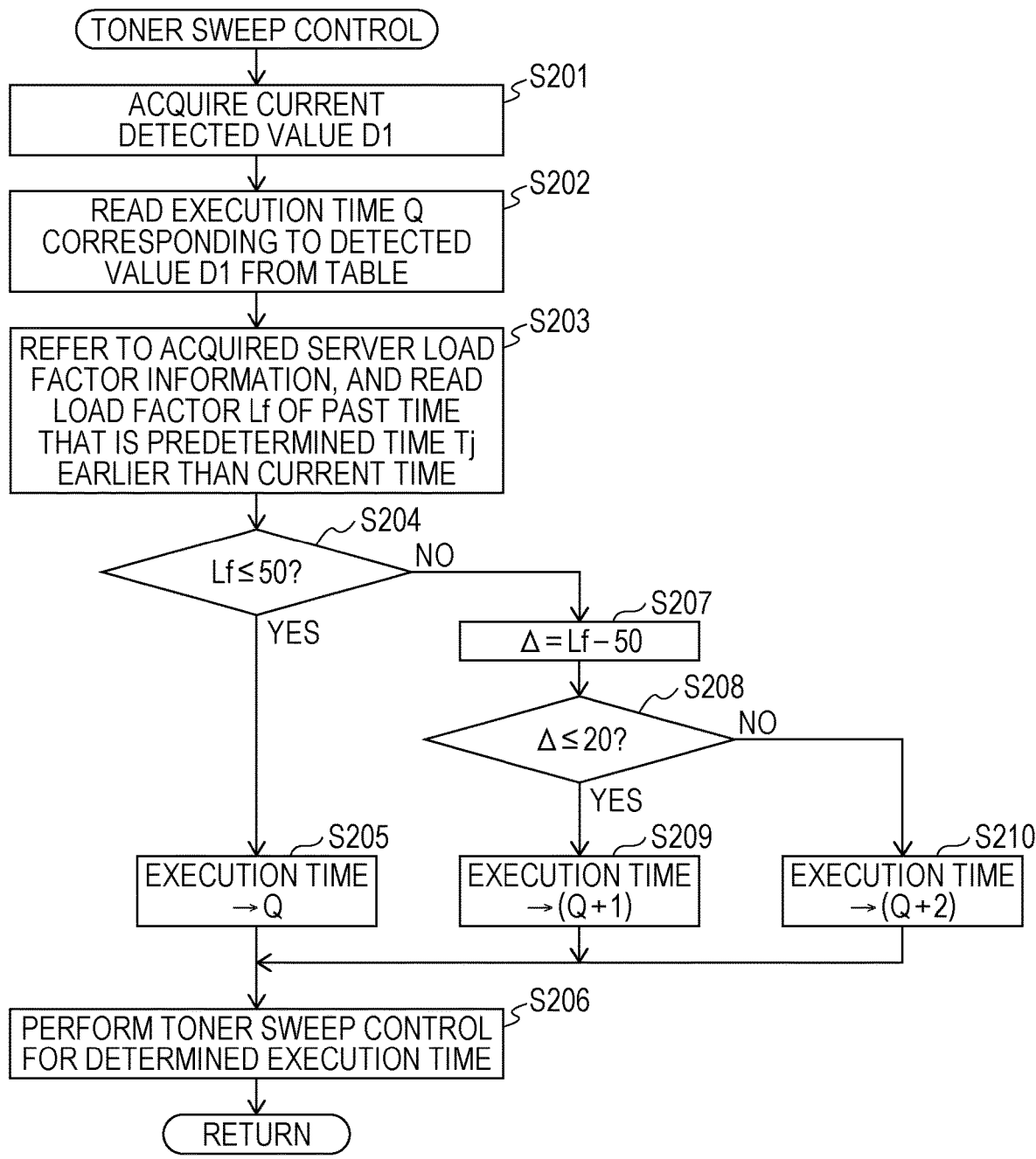
FIG. 19 is a flowchart specifically showing the process of the toner sweep control.

FIG. 19 is a flowchart specifically showing the process of the toner sweep control according to this embodiment. The controller 50 of the printer 2 performs this process in place of the ATVC process in the step S5 shown in FIG. 8 according to the first embodiment.

As shown in FIG. 19, the value D1 currently detected by the temperature and humidity detection sensor 16 is acquired (step S201). This detected value is a detected temperature value. The sweep control execution time Q corresponding to the detected value D1 is then read from the control condition table 301 (step S202).

The power-off period server load factor information acquired from the server 3 is then referred to, and the load factor Lf at the past time that is the predetermined time Tj earlier than the current time is read out (step S203). For example, in a case where the predetermined time Tj is one hour, "30%" is read out in the pattern 2 shown in FIG. 15, and "60%" is read out in the pattern 3.

A check is then made to determine whether the read load factor Lf is not higher than the predetermined threshold (=50%) (step S204). If the load factor Lf is determined not to be higher than the threshold ("Yes" in step S204), the execution time of the toner sweep control is determined to be the above execution time Q (step S205), and the process moves on to step S206.

If the load factor Lf is determined to be higher than the predetermined threshold ("No" in step S204), on the other hand, a difference Δ is calculated by subtracting the predetermined threshold (=50%) from the load factor Lf (step S207).

If the calculated difference Δ is determined not to be larger than the predetermined value (=20) ("Yes" in step S208), the execution time of the toner sweep control is determined to be a time that is "one minute" longer than the above execution time Q (step S209), and the process moves on to step S206. If the difference Δ is determined to be larger than the predetermined value ("No" in step S208), the execution time of the toner sweep control is determined to be a time that is "two minutes" longer than the above execution time Q (step S210), and the process moves on to step S206.

As described above, the larger the difference Δ is, the more the in-machine temperature of the printer 2 rises due to the influence of the amount of heat generated from the server 3 during the last power-off period. In such an environment, toner clumping might easily occur, and therefore, a long execution time is set for the toner sweep control. In step S206, the toner sweep control is performed for the determined execution time. Although detected temperatures are used in the above described example, this embodiment can also be applied to control operations using humidity values.

As described above, the execution time of the toner sweep control is determined in accordance with the operation status of the server 3 during a power-off period. In this manner, it is possible to remove the toner clumped in the replenishing pipe 8K due to the heat generated from the server 3 during the power-off period, and sweep the clumped toner out of the developing part 13, to prevent the clumped toner from remaining in the developing part 13. In the above described example, the toner sweep control has been explained, but this embodiment can also be applied to a toner bottle rotation process, for example.

The present invention is not limited to an image forming apparatus, but may also relate to a method of determining a control condition for the image former 2a, such as a transfer bias voltage or a toner bottle rotation time. The present invention may further relates to a program for a computer to implement the method. The program according to an embodiment of the present invention can be recorded on various kinds of computer-readable recording media, such as magnetic disks including magnetic tape and flexible disks, optical recording media, including DVD-ROMs, DVD-RAMs, CD-ROMs, CD-Rs, MOs, and PDs, and recording media, of flash memory types. The program may be produced and distributed in the form of such recording media, or may be transmitted and supplied as a program via various kinds of wired and wireless networks including the Internet, broadcasts, electrical communication lines, and satellite communications.

MODIFICATIONS

Although embodiments of the present invention have been described so far, the present invention is of course not limited to the above described embodiments, and the modifications described below may be made.

(1) In the above described example cases in the respective embodiments, a transfer bias voltage, a toner bottle rotation time, or an execution time for toner sweep control is used as a control condition for the image former 2a. However, embodiments of the present invention are not limited to these examples.

For example, an idle rotation time for the photosensitive drum 11 can be used. Discharge products (such as NOx) generated during charging often adhere to the surface of the photosensitive drum 11 electrically charged by the charger 12. If a large number of discharge products remain on the surface of the photosensitive drum 11, the electric resistance value of the surface of the photosensitive drum 11 becomes lower than its original value, for example. This will cause image quality degradation. Therefore, when any printing operation is not being performed, such as when the power supply is on, an idle rotation operation is performed to rotate the photosensitive drum 11 and scrape off the discharge products with the cleaning blade 14a.

The discharge products on the photosensitive drum 11 easily solidify on the photosensitive drum 11 due to moisture absorption. Where the in-machine humidity is higher, the solidification due to moisture absorption progresses faster, and scraping off the discharge products with the cleaning blade 14a becomes more difficult. Therefore, in a case where the in-machine humidity is high, the duration of the idle rotation operation is made longer than in a case where the in-machine humidity is low, so that the removal of the discharge products with the cleaning blade 14a is not hindered.

However, if the execution time of the idle rotation operation is determined only from the in-machine humidity detected at a time when the power supply is switched on, the influence of the changes in the environment during the power-off period is not taken into account as in the above described case where the transfer bias voltage is determined.

For example, in a case where the humidity detected when the power supply is switched on falls within the normal humidity range, even if solidification of the discharge products on the photosensitive drum 11 has progressed because the in-machine humidity during the last power-off period was high, a short execution time corresponding to a normal humidity is adopted for the idle rotation operation. As a result, a large number of discharge products might remain on the photosensitive drum 11.

Therefore, the execution time of the idle rotation operation to be performed when the power supply is switched on is determined as a control condition, in accordance with the in-machine humidity detected at a time of switching on of the power supply and the changes in humidity during the last power-off period. The idle rotation operation of the photosensitive drum 11 is then performed only for the determined execution time.

In controlling the idle rotation operation of the photosensitive drum 11, if the difference $\Delta$ ($=D1-D2$) between the current detected humidity value D1 and the detected humidity value D2 at a past time that is a predetermined time (one hour, for example) earlier than the current time in the power-off period is a negative value, the value to be added to the execution time Q corresponding to the current detected humidity value D1 is made greater as the absolute value of the difference Δ becomes greater, as in the above described toner sweep control. Through such control, a long execution time can be set for the idle rotation operation. This idle rotation operation can be performed not only for the photosensitive drum 11, but also for an image earner including a photosensitive member such as a photosensitive belt.

Also, in a case where the electric resistance value of the photosensitive drum 11 varies due to changes in the environment such as the temperature and the humidity during a power-off period, the amount of electric charge of the charger 12 to be used in print jobs after the power supply is switched on can be determined as a control condition, with the changes and transitions in the environment during a power-off period being taken into account.

Further, in a case where the developer contained in the housing (not shown) of the developing part 13 might also clump like the replenishment toner in a toner bottle, the stirring time required for a stirring member (not shown) to stir the developer in the housing can also be used as a control condition.

As described above, in accordance with the changes in the in-machine environment during a power-off period, any condition that should be used in the print jobs to be executed after the power supply is switched on can be used as a control condition that needs to be changed.

(2) In the above described first through third embodiments, the current temperature or humidity D1 at a time when the power supply is switched on is detected with the temperature and humidity detection sensor 16. However, embodiments of the present invention are not limited to these embodiments. For example, among the detected values included in the power-off period temperature and humidity information, the value detected immediately before the current time, such as the value detected one minute earlier, can be used as the current detected value D1. It is unlikely that the in-flight environment greatly differs between the current time and the time one minute earlier. Accordingly, with the value detected one minute earlier, an appropriate control condition can be determined as in the above described embodiments. In other words, even if the current in-machine temperature or humidity at a time when the power supply is switched on is not detected, a control condition can be determined only from the values detected during the power-off period.

(3) In the example configurations of the above described embodiments, the image forming apparatus 1 includes the printer 2 and the server 3 that is independent of the printer 2. However, embodiments of the present invention are not limited to such configurations. For example, the controller 70 of the server 3 may be included in part of the controller 50 of the printer 2, and the power supply 80 of the server 3 may remain in the server 3. Alternatively, all the components of the server 3 may be incorporated into the printer 2, to form the image forming apparatus 1. Further, the controller 50 of the printer 2 may be included in part of the controller 70 of the server 3.

That is, a control device (the controller 50 or 70) that controls the image former 2a designed to form images on recording sheets such as paper sheets S, and acquires the results of detection performed by a detector such as the temperature and humidity detection sensor 16 designed to detect environment variables such as the ambient temperature of the image former 2a should include at least the power supply 80 and the control condition determiner 55.

Specifically, the power supply 80 (the second power supply) performs power feeding to the temperature and humidity detection sensor 16 during a power feeding suspension period during which power feeding from the power supply 60 (the first power supply) to the image former 2a and the temperature and humidity detection sensor 16 (the detector) is not performed. When power feeding from the power supply 60 to the image former 2a is started at the end of the power feeding suspension period, and the image former 2a enters a ready state in which image formation can be performed (or returns from a warming-up mode or a sleep mode, for example), the control condition determiner 55 (the determiner) determines a control condition (such as a transfer bias voltage, a toner bottle rotation time, or a toner sweep control time) for the image former 2a, in accordance with the results of detection performed by the temperature and humidity detection sensor 16 during the power feeding suspension period. The power supply 80 and the control condition determiner 55 may be disposed as part of the control device in either the printer 2 or the server 3.

Further, in a configuration in which the load factor of the server 3 is detected by the load factor detector 201 during a power-off period, and thus, the changes in the environment around the image former 2a during the power-off period are detected, power feeding from the power supply 80 to the load factor detector 201 should be performed during the power-off period.

The power supply 60 and the power supply 80 are individually capable of switching between outputting power and suspending power, and a storage battery may be used as the power supply 80, for example.

Also, in the configurations described above, a device independent of the printer 2 (main body) is used as the server 3 connected to a network. However, embodiments of the present invention are not limited to this configuration. It is possible to employ an auxiliary device that includes a server. Such an auxiliary device can communicate with the main body, and supports, extends, and adds various functions of the main body, such as image formation and image processing. The power supply 60 is included in the main body, and the power supply 80 also serves as the power supply in the auxiliary device. The main body and the auxiliary device are not limited to the above described configuration in which the main body is placed on the auxiliary device. For example, the auxiliary device may be located adjacent to a side surface of the main body. In a case where the main body and the auxiliary device are in such a positional relationship that the heat generated from the auxiliary device during a power-off period of the main body is transferred to the main body, and the heat transferred to the main body affects the image former 2a included in the main body, the above described control condition determination can be performed.

(4) In the above described examples in the embodiments, a tandem color printer is used as the image former 2a of the image forming apparatus according to each of the embodiments of the present invention. However, embodiments of the present invention are not limited these examples. It is possible to use any image forming apparatus that performs monochrome image formation or any image forming apparatus that performs color image formation.

Also, in the above described example configurations, the temperature and humidity detection sensor 16 is provided as an environment sensor that detects the ambient temperature and the like of the image former 2a. However, embodiments of the present invention are not limited to this configuration. It is possible to employ any detector that can detect environment variables around the image former 2a, including temperature, humidity, atmospheric pressure, and server load factor, which affect the quality of each image formed by the image former 2a. For example, a sensor that detects only temperature or detects only humidity may be disposed close to the image former 2a.

Further, it goes without saying that numerical values of humidities, temperatures, times, thresholds, and the like are not limited to those mentioned above, and temperature values, humidity values, and the like that are suitable in the device configuration are determined beforehand through experiments or the like.

It is also possible to combine the above described embodiments and the above described modifications any conceivable manner.

The present invention can be applied to an image forming apparatus that forms an image on a recording sheet.

Although embodiments of the present invention have been described and illustrated in detail, the disclosed embodiments are made for purposes of illustration and example only and not limitation. The scope of the present invention should be interpreted by terms of the appended claims.

What is claimed is:
1. An image forming apparatus, comprising:
   an image former that forms an image on a sheet;
   a server;
   a sensor that acquires environment information around the image former;

a storage that stores the environment information detected by the sensor;

a hardware processor that controls an image forming operation of the image former according to an image forming condition based on the environment information stored in the storage and acquired a predetermined time earlier;

a first power supply that performs power feeding to the image former, the sensor, and the hardware processor; and a second power supply that performs power feeding to the server;

wherein the second power supply performs power feeding to the sensor, when the power feeding of the first power supply is stopped, then power feeding of the first power supply is started again, and image formation is performed, and wherein image formation is to be performed based on the environment information acquired the predetermined time earlier, and power feeding of the first power supply is stopped.

2. The image forming apparatus according to claim 1, wherein the hardware processor determines the image forming condition from a magnitude of a difference between a value detected at a present moment and the stored environment information.

3. The image forming apparatus according to claim 1, wherein the hardware processor:
calculates a length of time during which a result of detection performed by the sensor is in a particular environment region from an off state to an on state; and
determines the image forming condition in accordance with the calculated length of time.

4. The image forming apparatus according to claim 1, wherein the hardware processor determines the image forming condition in accordance with a change in a result of detection performed by the sensor from an off state to an on state.

5. The image forming apparatus according to claim 1, wherein the image forming condition is an execution time of a predetermined operation to be executed by the image former after a start of power feeding from the first power supply to the image former,
wherein the hardware processor is configured to select execution or prohibition of the predetermined operation,
wherein, when the execution is selected, the image former is made to execute the predetermined operation based on the image forming condition, and
wherein, when the prohibition is selected, the image former is prohibited from executing the predetermined operation.

6. The image forming apparatus according to claim 5, wherein the selection is made in accordance with a type of an image to be formed by the image former after entering an image formation ready state.

7. The image forming apparatus according to claim 5, wherein the image former can execute an idle rotation operation to idly rotate an image carrier, a toner bottle rotation process to stir toner by rotating a toner bottle containing the toner for replenishing a developing part, or toner sweep control to remove toner on an image carrier with a cleaner by supplying toner from a toner hopper to the developing part through a replenishing pipe, and consuming the toner on the image carrier through development, and wherein the predetermined operation is one of the idle rotation operation, the toner bottle rotation process, and the toner sweep control.

8. The image forming apparatus according to claim 1, wherein the sensor is an environment sensor, and
wherein power feeding from the first power supply to the sensor is started at an end of an off state.

9. The image forming apparatus according to claim 1, further comprising:
a controller that is constantly in operation,
wherein the second power supply further performs power feeding to the controller,
wherein the image former is disposed at a position where heat generated from the controller operating from an off state to an on state is transferred to the image former, and
wherein the sensor is a load factor detector that detects a load factor of the controller as an environment variable around the image former, the sensor being included in the controller.

10. The image forming apparatus according to claim 9, wherein the hardware processor determines the image forming condition, in accordance with:
the load factor of the hardware processor, the load factor being detected by the sensor from the off state to the on state; and
a result of detection currently performed by a second sensor that detects temperature or humidity around the image former as power feeding to the second sensor is started at an end of the off state, the second sensor being independent of the sensor, power feeding not being performed from the second power supply to the second sensor, power feeding not being performed from the first power supply to the second sensor from the off state to the on state.

11. The image forming apparatus according to claim 1, wherein the storage stores a result of detection performed by the sensor from an off state to an on state.

12. The image forming apparatus according to claim 1, wherein the sensor detects temperature or humidity.

13. The image forming apparatus according to claim 1,
wherein an environment variable detected by the sensor with respect to the image former affects quality of an image formed by the image former; and
wherein the first power supply is capable of switching between power feeding to the image former and suspension of the power feeding.

14. The image forming apparatus according to claim 13, further comprising:
a main body; and
an auxiliary device that is independent of the main body and is capable of communicating with the main body,
wherein the first power supply and the second power supply are individually capable of switching between outputting power and suspending power,
wherein the image former of the image forming apparatus and the first power supply of the image forming apparatus are included in the main body, and
wherein the second power supply is included in the auxiliary device.

15. The image forming apparatus according to claim 14, wherein the main body is placed on the auxiliary device, or
wherein the auxiliary device is disposed adjacent to a side surface of the main body.

16. The image forming apparatus according to claim 15, wherein the auxiliary device is connected to a network and is constantly in operation.

17. The image forming apparatus according to claim 16, wherein the auxiliary device includes a hardware processor that performs processing as the server, and
   wherein the sensor of the image forming apparatus is a load factor detector that detects a load factor of the hardware processor of the auxiliary device as an environment variable around the image former of the image forming apparatus, the sensor of the image forming apparatus being included in the hardware processor of the auxiliary device.

18. The image forming apparatus according to claim 17, further comprising:
   a second sensor that detects temperature or humidity of the image former of the image forming apparatus as power feeding from the first power supply of the image forming apparatus to the second sensor is started at an end of an off state,
   the second sensor being independent of the sensor, power feeding not being performed from the second power supply of the control device to the second sensor, power feeding not being performed from the first power supply of the image forming apparatus to the image former of the image forming apparatus and the sensor from the off state to an on state,
   wherein the hardware processor of the image forming apparatus determines an image forming condition for the image former of the image forming apparatus, in accordance with a load factor of the hardware processor of the auxiliary device, the load factor being detected by the sensor from the off state to the on state, and a result of detection currently performed by the second sensor.

19. The image forming apparatus according to claim 13, wherein the sensor of the image forming apparatus is an environment sensor, and
   wherein power feeding from the first power supply to the sensor of the image forming apparatus is started at an end of a power feeding suspension period during which power feeding from the first power supply to the image former of the image forming apparatus and the sensor of the image forming apparatus is not performed.

20. The image forming apparatus according to claim 1, wherein the environment of the image former is around the image forming apparatus and inside the image former.

21. The image forming apparatus according to claim 1, wherein the predetermined time is between one and three hours.

22. A method, comprising:
   providing an image former that forms an image on a sheet;
   providing a server;
   providing a sensor that acquires environment information around the image former;
   providing a storage that stores the environment information detected by the sensor;
   providing a hardware processor that controls an image forming operation of the image former according to an image forming condition based on the environment information stored in the storage and acquired a predetermined time earlier;
   providing a first power supply that performs power feeding to the image former, the sensor, and the hardware processor; and
   providing a second power supply that performs power feeding to the server, wherein the second power supply performs power feeding to the sensor, when the power feeding of the first power supply is stopped, then power feeding of the first power supply is started again, and image formation is performed, and
   wherein image formation is to be performed based on the environment information acquired the predetermined time earlier, and power feeding of the first power supply is stopped.

* * * * *